US007644429B2

(12) United States Patent
Bayassi et al.

(10) Patent No.: US 7,644,429 B2
(45) Date of Patent: Jan. 5, 2010

(54) BROADCAST AND RECEPTION, AND CONDITIONAL ACCESS SYSTEM THEREFOR

(75) Inventors: Mulham Bayassi, Paris (FR); Pierre De La Tullaye, Rueil Malmaison (FR); Jean-Francois Jezequel, Cormeille en Parisis (FR)

(73) Assignee: Nagra Thomson Licensing, Boulogne-Billancourt (FR)

( * ) Notice: Subject to any disclaimer, the term of this patent is extended or adjusted under 35 U.S.C. 154(b) by 1298 days.

(21) Appl. No.: 10/201,641

(22) Filed: Jul. 24, 2002
(Under 37 CFR 1.47)

(65) Prior Publication Data

US 2004/0068541 A1      Apr. 8, 2004

Related U.S. Application Data

(63) Continuation of application No. 10/007,662, filed on Dec. 10, 2001, now abandoned, which is a continuation of application No. 09/780,625, filed on Feb. 12, 2001, now abandoned, which is a continuation of application No. 09/571,011, filed on May 15, 2000, now abandoned, which is a continuation of application No. 09/400,314, filed on Sep. 21, 1999, now abandoned, which is a continuation of application No. PCT/EP97/02108, filed on Apr. 25, 1997.

(51) Int. Cl.
*H04N 7/20* (2006.01)
(52) U.S. Cl. .............................. 725/63; 725/25; 725/31; 725/68; 725/146
(58) Field of Classification Search ............... 725/147, 725/110, 65, 66, 1–8, 86–104, 151, 152
See application file for complete search history.

(56) References Cited

U.S. PATENT DOCUMENTS 5,144,663 A     9/1992   Kudelski et al. ............... 380/16
5,311,325 A *   5/1994   Edwards et al. ................. 725/8

(Continued)

FOREIGN PATENT DOCUMENTS

WO           WO 94/14284         6/1994

OTHER PUBLICATIONS

EBU Technical Review, Winter 1995, No. 266, Dec. 21, 1995, pp. 64-77.*
"Functional Model of a Conditional Access Syztem", EBU Technical Review, No. 266, Dec. 21, 1995, pp. 64-77.

(Continued)

*Primary Examiner*—Christopher Kelley
*Assistant Examiner*—Timothy R Newlin
(74) *Attorney, Agent, or Firm*—Osha • Liang LLP

(57) ABSTRACT

A digital satellite television system has a plurality of set-top-boxes associated with a plurality of end users' television receivers, a modem and a decoder housed in each STB, a Subscriber Authorization System (SAS) incorporating or having associated therewith a plurality of communication servers, means included in the SAS for generating Electronic Managements Messages (EMM), a back channel interconnecting each of the STBs individually with the SAS, means included in the SAS and each STB so that the necessary information required to inject a relevant EMM into the system is supplied directly to the relevant communication server included in or associated with the SAS to authorize the release of the said EMM and/or means to connect the modem to the back channel and means whereby an EMM is transmissible to the decoder directly from a relevant communication server included in or associated with the SAS. Further important features are also disclosed.

6 Claims, 17 Drawing Sheets

U.S. PATENT DOCUMENTS 5,329,590 A * 7/1994 Pond .......................... 380/242
5,642,418 A * 6/1997 Farris et al. ................. 380/211
5,805,204 A * 9/1998 Thompson et al. ............ 725/48
5,917,915 A * 6/1999 Hirose ....................... 380/228

OTHER PUBLICATIONS

International Search Report, Application No. PCT/EP97/02108, 4 pages.

* cited by examiner

Fig.8.

| G1 | 0 | 1 | 1 | 1 | 0 | ... | 1 | 0 | 1 | 0 |
|----|---|---|---|---|---|-----|---|---|---|---|
|    | 0 | 1 | 2 | 3 | 4 |     | 253 | 254 | 255 | 256 |

| SUBSCRIPTION BITMAP | MANAGEMENT KEYS | EXPLOITATION KEYS | OBSOLESCENCE DATE |
|---|---|---|---|

| HEADER 3060 | EMM PROPER 3062 | | SIGNATURE 3064 |
|---|---|---|---|
|  | ID 3172 | LENGTH 3174 | SESSION NUMBER |

PID 3170

Fig. 19.

| | | | |
|---|---|---|---|
| | CARD ID ZONE | | 151 |
| | RANDOM GEN. ZONE | | 152 |
| | MANAGEMENT ZONE | | 153 |
| | OPERATOR 1 ID | | 154 |
| | OPERATOR 2 ID | | 155 |
| | ⋮ | | |
| | OPERATOR N ID | | 156 |
| 1 | EMM KEY | DATA | 157 |
| 1 | ECM KEY | DATA | 159 |
| 2 | EMM KEY | DATA | |
| 1 | SUBS BITMAP | DATA | 161 |
| 0 | OBJECT FREE | | 166 |
| 3 | ECM KEY | DATA | |
| 1 | TOKEN WALLET | DATA | 163 |
| 1 | PPV EVENT | DATA | 165 |
| | ⋮ | | |
| N | ECM KEY | DATA | |

BROADCAST AND RECEPTION, AND CONDITIONAL ACCESS SYSTEM THEREFOR

This application is a continuation of application Ser. No. 10/007,662, filed Dec. 10, 2001 now abandoned, which is a continuation of application Ser. No. 09/780,625, filed Feb. 12, 2001 now abandoned, which is a continuation of application Ser. No. 09/571,011, filed May 15, 2000 now abandoned, which is a continuation of application Ser. No. 09/400,314, filed Sep. 21, 1999 now abandoned, which is a continuation of PCT/EP97/02108, filed Apr. 25, 1997.

The present invention relates to a broadcast and reception system, in particular to a mass-market digital interactive satellite television system, and to a conditional access system therefor.

In particular, but not exclusively, the invention relates to a mass-market broadcast system having some or all of the following preferred features:—
- It is an information broadcast system, preferably a radio and/or television broadcast system
- It is a satellite system (although it could be applicable to cable or terrestrial transmission)
- It is a digital system, preferably using the MPEG, more preferably the MPEG-2, compression system for data/signal transmission
- It affords the possibility of interactivity.

More particularly the present invention relates to so-called pay television (or radio) where a user/viewer selects a programme/film/game to be viewed for which payment is to be made, this being referred to as a pay-per-view (PPV) or in the case of data to be downloaded a so-called pay-per-file (PPF).

With such known PPV or PPF systems a significant amount of time is required to be spent by the user/viewer in order to carry out the actions necessary to actually access the product being selected.

For example, in one known system the sequence of steps which have to be carried out are as follows:—
i) The user telephones a so-called Subscriber Management System (SMS) which in this known system includes a number of human operators which answer the subscriber's call and to whom the subscriber communicates the necessary information concerning the selected product and concerning the financial status of the subscriber to a so-called Subscriber Authorization System (SAS) which has included in it or associated with it a plurality of communications servers.
ii) The operator at the SMS then has to check the financial status of the user before authorising the connection from the communications servers to the user's television set so that the product can be delivered and viewed by the user.

In another known system the human operator is replaced by an automatic voice server so that when the user telephones the SMS he/she hears a voice activated recording to which the user conveys the same information as I) above.

This second arrangement reduces the delay inherent in the first described arrangement which can be more easily overloaded when large numbers of users are wishing to order a product at the same time.

However, even with this second arrangement the user is involved in inputting significant information in the form of lengthy serial numbers which operation provides plenty of scope for error as well as being time consuming.

The third known arrangement involves the user making use of existing screen based systems such as MINITEL in France and PRESTEL in the United Kingdom, which systems replace the voice activated server referred to above in connection with the second arrangement. The MINITEL and PRESTEL systems themselves incorporate a modem at the consumer end.

In all these known arrangements the user is involved in the expenditure of significant time and effort in inputting all the information necessary to enable the system to in effect authorize the transmission of the chosen product to the user's television set.

In the case of a satellite television system there is a further delay involved in the user actually receiving the product selected.

In PPV and PPF systems the key element in controlling the user's access to products are so-called Entitlement Management Messages (EMM) which have to be injected into the system in order to give the user product access. More particularly the EMMs are the mechanism by which the encrypted data representative of a product is decrypted for a particular individual user.

In known satellite television systems the EMMs are transmitted to the user's televisions via the satellite link at regular intervals in the MPEG-2 data stream. Thus in the case of a particular user's EMM there can be a significant delay of perhaps several minutes before the user's next EMM transmission arrives at that user's television set.

This transmission delay is in addition to the delay referred to earlier which is inherent in the user having to manually input certain data into the system. The cumulative effect of these two delays is that it may take perhaps typically five minutes for a user to be able to gain access to the selected product.

The present invention is concerned with overcoming this problem.

In a first aspect, the present invention provides a conditional access system comprising:
means for generating a plurality of (preferably conditional access) messages; and
means for receiving the messages, said receiving means being adapted to communicate with said generating means via a communications server connected directly to said generating means.

Preferably, the message is an entitlement message for transmission (for example by broadcast) to the receiving means, said generating means being adapted to generate entitlement messages in response to data received from said receiving means.

The generating means may be arranged to transmit a message as a packet of digital data to said receiving means either via said communications server or via a satellite transponder.

The receiving means may be connectable to said communications server via a modem and telephone link.

In a related aspect, the present invention provides a conditional access system for affording conditional access to subscribers, comprising:
a subscriber management system;
a subscriber authorization system coupled to the subscriber management system; and
a communications server; said server being connected directly to the subscriber authorization system.

The system may further comprise a receiver/decoder for the subscriber, the receiver/decoder being connectable to said communications server, and hence to said subscriber authorization system, via a modem and telephone link.

In a second aspect, the present invention provides a broadcast and reception system including a conditional access system as described above.

In a third aspect, the present invention provides a broadcast and reception system comprising:

means for generating a plurality of entitlement messages relating to broadcast programs;

means for receiving said messages from said generating means; and means for connecting the receiving means to the generating means to receive said messages, said connecting means being capable of effecting a dedicated connection between the receiving means and the generating means.

The dedicated connection would typically be a hard-wired connection and/or a modemmed connection, with the possibility of the connection been made via a cellular telephone system. In other words, the dedicated connection is capable of forming a channel of communication (from point to point). This is in contrast to broadcasting of information through the air or ambient medium. The connecting means would typically be a modem at the receiving means.

Hence, in a closely related aspect, the present invention provides a broadcast and reception system comprising:

means for generating a plurality of entitlement messages relating to broadcast programs;

means for receiving said messages from said generating means via a modem; and means for connecting said modem to said generating means and said receiving means.

The above features can afford the advantage of providing the user the necessary viewing authorization (via the EMM) more quickly than has hitherto been possible, partly because, since the SAS typically uses a smaller amount of computer code than the SMS, the SAS can operate more efficiently (and in real time), partly because the SAS can itself, directly, generate the requisite EMM, and partly because the EMM can be passed to the user or subscriber via a dedicated (typically modemmed) link.

Preferably, the generating means is connected to said modem via a communications server which is preferably included in or associated with said generating means.

The receiving means may be further adapted to receive said entitlement messages via a satellite transponder.

The receiving means may be a receiver/decoder comprising means for receiving a compressed MPEG-type signal, means for decoding the received signal to provide a television signal and means for supplying the television signal to a television.

Preferably, the receiving means is adapted to communicate with said generating means via said modem and connecting means. The receiving means may comprise means for reading a smartcard insertable thereinto by an end user, the smartcard having stored therein data to initiate automatically the transmission of a message from said receiving means to said generating means upon insertion of the smartcard by the end user.

In addition, the system may further comprise a voice link to enable the end user of the broadcast and reception system to communicate with the generating means.

It will be understood from the above that the present invention provides two arrangements by which the time it takes for an end user to access a desired product is reduced. Preferably both arrangements are employed to achieve the maximum time saving but either arrangement can be used individually.

According to a further aspect of the present invention, there is provided a broadcast and reception system, comprising, at the broadcast end:

a broadcast system including means for broadcasting a callback request; and at the reception end:

a receiver including means for calling back the broadcast system in response to the callback request.

By providing that the broadcast system can request the receiver to call it back, the possibility is afforded of the broadcast system obtaining information from the receiver about the state of the receiver.

Preferably, the means for calling back the broadcast system includes a modem connectable to a telephone system. By using a modemmed back channel, a simple way of putting the invention into effect can be provided.

Preferably also, the means for calling back the broadcast system is arranged to transfer to the broadcast system information concerning the receiver. This information might include the number of remaining tokens, the number of pre-booked sessions, and so on.

Preferably, the broadcast system includes means for storing the information, so that it can be processed at a later time, as desired.

Preferably, the broadcast means is arranged to broadcast a callback request which includes a command that the callback be made at a given time, and the means for calling back the broadcast system is arranged to respond to said command. By arranging for the callback to be later than the actual request, greater flexibility can be imparted to the system.

The broadcasting means may be arranged to broadcast as the callback request one or more Entitlement Messages for broadcast.

Preferably, the broadcast system includes means for generating a check message (such as a random number) and passing this to the receiver, the receiver includes means for encrypting the check message and passing this to the broadcast system, and the broadcast system further includes means for decrypting the check message received from the receiver and comparing this with the original check message. In this way it can be checked whether the receiver is genuine.

Any of the above features may be combined together in any appropriate combination. They may also be provided, as appropriate, in method aspects.

Preferred features of the present invention will now be described, purely by way of example, with reference to the accompanying drawings, in which:—

FIG. 8 is a schematic diagram of a group subscription bitmap used in the automatic renewal procedure;

FIG. 9 shows the structure of an EMM used in the automatic renewal procedure;

FIG. 10 shows in detail the structure of the EMM;

FIG. 19 is a schematic diagram of an arrangement of zones in the memory of the smartcard.

Figure 1:
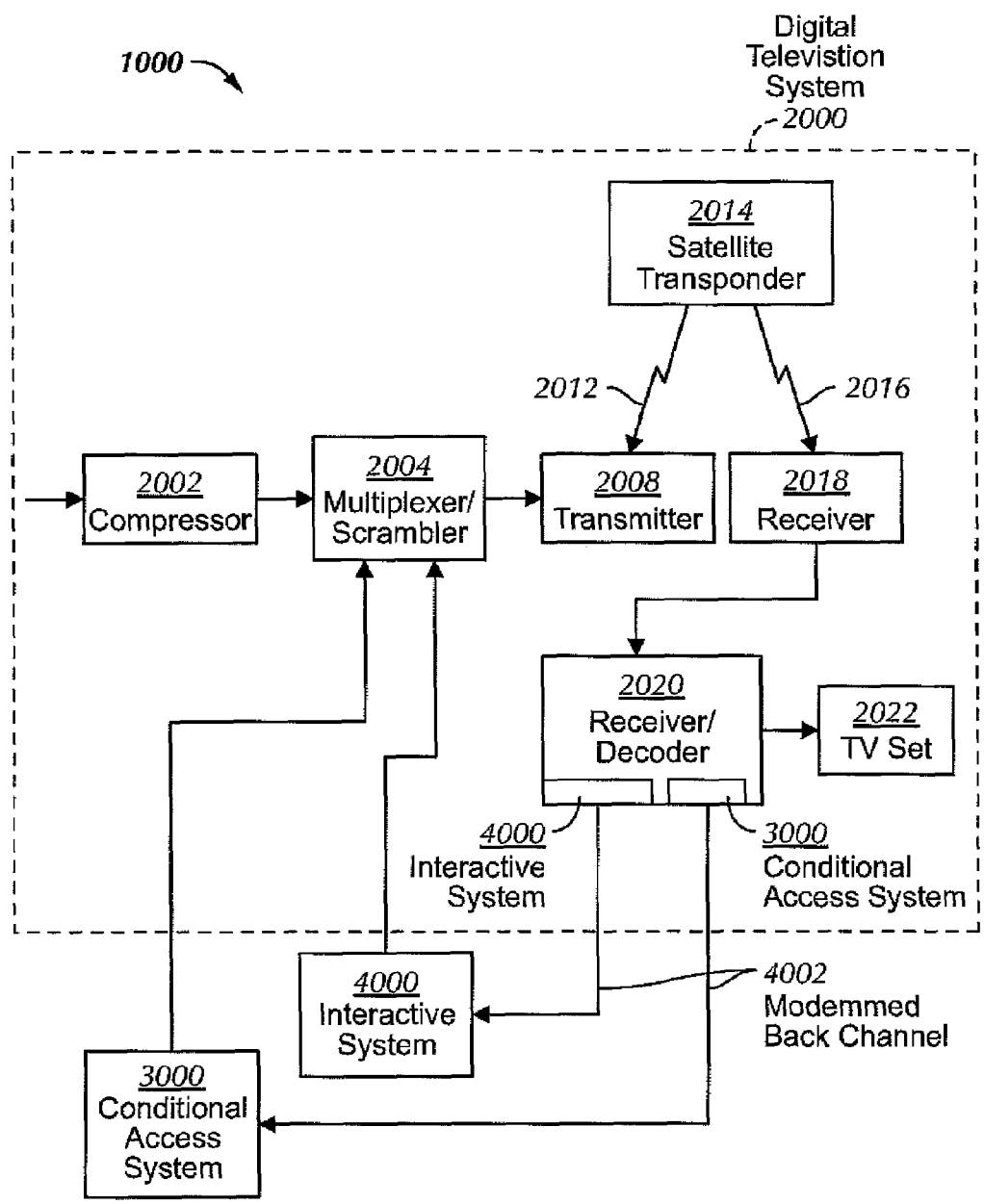
FIG. 1 shows the overall architecture of a digital television system according to the preferred embodiment of the present invention.

An overview of a digital television broadcast and reception system 1000 according to the present invention is shown in FIG. 1. The invention includes a mostly conventional digital television system 2000 which uses the known MPEG-2 compression system to transmit compressed digital signals. In more detail, MPEG-2 compressor 2002 in a broadcast centre receives a digital signal stream (typically a stream of video signals). The compressor 2002 is connected to a multiplexer and scrambler 2004 by linkage 2006. The multiplexer 2004 receives a plurality of further input signals, assembles one or more transport streams and transmits compressed digital signals to a transmitter 2008 of the broadcast centre via linkage 2010, which can of course take a wide variety of forms including telecom links. The transmitter 2008 transmits electromagnetic signals via uplink 2012 towards a satellite transponder 2014, where they are electronically processed and broadcast via notional downlink 2016 to earth receiver 2018, conventionally in the form of a dish owned or rented by the end user. The signals received by receiver 2018 are transmitted to an integrated receiver/decoder 2020 owned or rented by the end user and connected to the end user's television set 2022. The receiver/decoder 2020 decodes the compressed MPEG-2 signal into a television signal for the television set 2022.

A conditional access system 3000 is connected to the multiplexer 2004 and the receiver/decoder 2020, and is located partly in the broadcast centre and partly in the decoder. It enables the end user to access digital television broadcasts from one or more broadcast suppliers. A smartcard, capable of decrypting messages relating to commercial offers (that is, one or several television programmes sold by the broadcast supplier), can be inserted into the receiver/decoder 2020. Using the decoder 2020 and smartcard, the end user may purchase events in either a subscription mode or a pay-per-view mode.

An interactive system 4000, also connected to the multiplexer 2004 and the receiver/decoder 2020 and again located partly in the broadcast centre and partly in the decoder, enables the end user to interact with various applications via a modemmed back channel 4002.

The conditional access system 3000 is now described in more detail.

Figure 2:
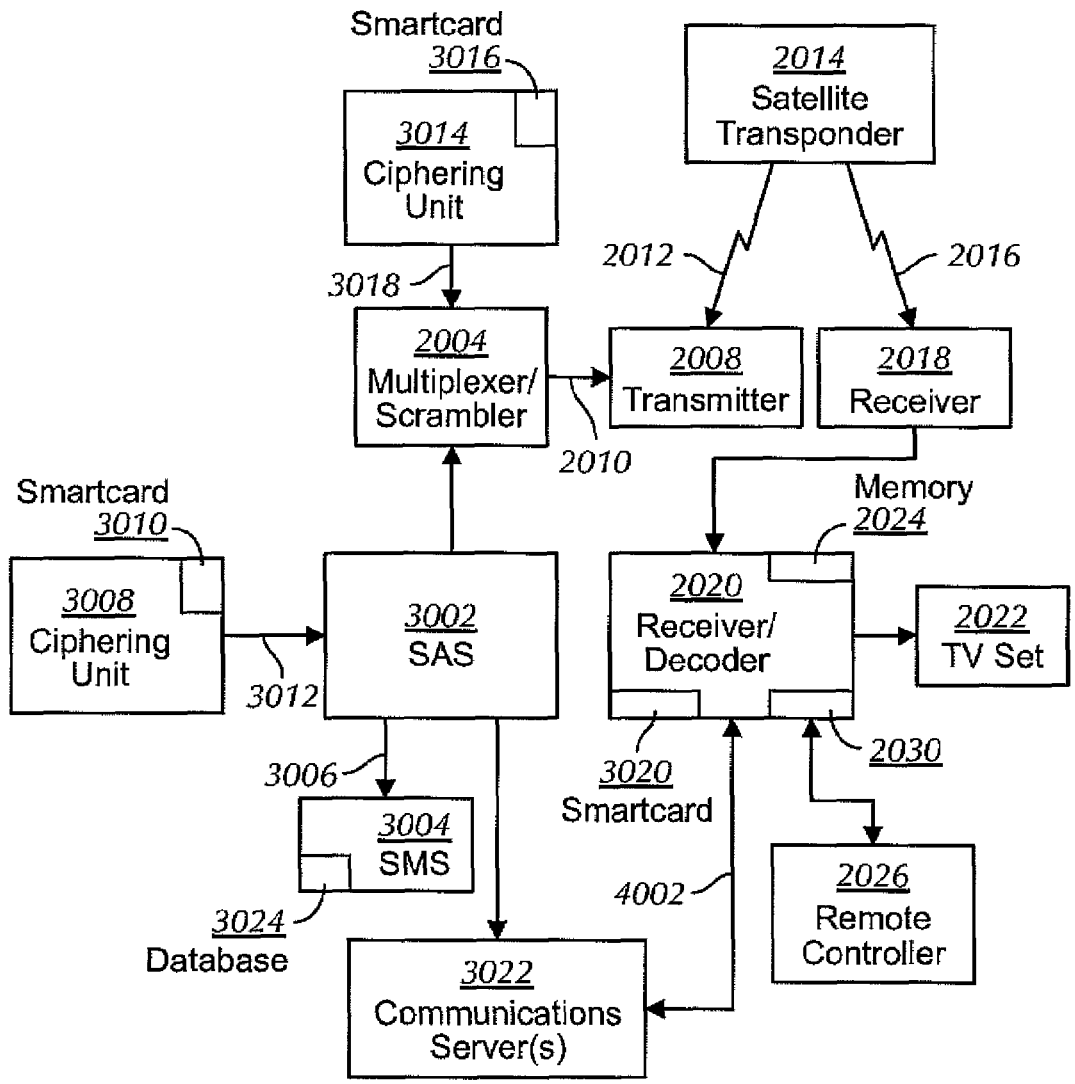
FIG. 2 shows the architecture of a conditional access system of the digital television system.

With reference to FIG. 2, in overview the conditional access system 3000 includes a Subscriber Authorization System (SAS) 3002. The SAS 3002 is connected to one or more Subscriber Management Systems (SMS) 3004, one SMS for each broadcast supplier, by a respective TCP-IP linkage 3006 (although other types of linkage could alternatively be used). Alternatively, one SMS could be shared between two broadcast suppliers, or one supplier could use two SMSs, and so on.

First encrypting units in the form of ciphering units 3008 utilising "mother" smartcards 3010 are connected to the SAS by linkage 3012. Second encrypting units again in the form of ciphering units 3014 utilising mother smartcards 3016 are connected to the multiplexer 2004 by linkage 3018. The receiver/decoder 2020 receives a "daughter" smartcard 3020. It is connected directly to the SAS 3002 by Communications Servers 3022 via the modemmed back channel 4002. The SAS sends amongst other things subscription rights to the daughter smartcard on request.

The smartcards contain the secrets of one or more commercial operators. The "mother" smartcard encrypts different kinds of messages and the "daughter" smartcards decrypt the messages, if they have the rights to do so.

The first and second ciphering units 3008 and 3014 comprise a rack, an electronic VME card with software stored on an EEPROM, up to 20 electronic cards and one smartcard 3010 and 3016 respectively, for each electronic card, one (card 3016) for encrypting the ECMs and one (card 3010) for encrypting the EMMs.

The operation of the conditional access system 3000 of the digital television system will now be described in more detail with reference to the various components of the television system 2000 and the conditional access system 3000.

Multiplexer and Scrambler

With reference to FIGS. 1 and 2, in the broadcast centre, the digital video signal is first compressed (or bit rate reduced), using the MPEG-2 compressor 2002. This compressed signal is then transmitted to the multiplexer and scrambler 2004 via the linkage 2006 in order to be multiplexed with other data, such as other compressed data.

The scrambler generates a control word used in the scrambling process and included in the MPEG-2 stream in the multiplexer 2004. The control word is generated internally and enables the end user's integrated receiver/decoder 2020 to descramble the programme.

Access criteria, indicating how the programme is commercialised, are also added to the MPEG-2 stream. The programme may be commercialised in either one of a number of "subscription" modes and/or one of a number of "Pay Per View" (PPV) modes or events. In the subscription mode, the end user subscribes to one or more commercial offers, or "bouquets", thus getting the rights to watch every channel inside those bouquets. In the preferred embodiment, up to 960 commercial offers may be selected from a bouquet of channels. In the Pay Per View mode, the end user is provided with the capability to purchase events as he wishes. This can be achieved by either pre-booking the event in advance ("pre-book mode"), or by purchasing the event as soon as it is broadcast ("impulse mode"). In the preferred embodiment, all users are subscribers, whether or not they watch in subscription or PPV mode, but of course PPV viewers need not necessarily be subscribers.

Both the control word and the access criteria are used to build an Entitlement Control Message (ECM); this is a message sent in relation with one scrambled program; the message contains a control word (which allows for the descrambling of the program) and the access criteria of the broadcast program. The access criteria and control word are transmitted to the second encrypting unit 3014 via the linkage 3018. In this unit, an ECM is generated, encrypted and transmitted on to the multiplexer and scrambler 2004.

Each service broadcast by a broadcast supplier in a data stream comprises a number of distinct components; for example a television programme includes a video component, an audio component, a sub-title component and so on. Each of these components of a service is individually scrambled and encrypted for subsequent broadcast to the transponder 2014. In respect of each scrambled component of the service, a separate ECM is required.

Programme Transmission

The multiplexer 2004 receives electrical signals comprising encrypted EMMs from the SAS 3002, encrypted ECMs from the second encrypting unit 3014 and compressed programmes from the compressor 2002. The multiplexer 2004 scrambles the programmes and transmits the scrambled programmes, the encrypted EMMs and the encrypted ECMs as electric signals to a transmitter 2008 of the broadcast centre via linkage 2010. The transmitter 2008 transmits electromagnetic signals towards the satellite transponder 2014 via uplink 2012.

Programme Reception

The satellite transponder 2014 receives and processes the electromagnetic signals transmitted by the transmitter 2008 and transmits the signals on to the earth receiver 2018, conventionally in the form of a dish owned or rented by the end user, via downlink 2016. The signals received by receiver 2018 are transmitted to the integrated receiver/decoder 2020 owned or rented by the end user and connected to the end user's television set 2022. The receiver/decoder 2020 demultiplexes the signals to obtain scrambled programmes with encrypted EMMs and encrypted ECMs.

If the programme is not scrambled, that is, no ECM has been transmitted with the MPEG-2 stream, the receiver/decoder 2020 decompresses the data and transforms the signal into a video signal for transmission to television set 2022.

If the programme is scrambled, the receiver/decoder 2020 extracts the corresponding ECM from the MPEG-2 stream and passes the ECM to the "daughter" smartcard 3020 of the end user. This slots into a housing in the receiver/decoder 2020. The daughter smartcard 3020 controls whether the end user has the right to decrypt the ECM and to access the programme. If not, a negative status is passed to the receiver/decoder 2020 to indicate that the programme cannot be descrambled. If the end user does have the rights, the ECM is decrypted and the control word extracted. The decoder 2020 can then descramble the programme using this control word. The MPEG-2 stream is decompressed and translated into a video signal for onward transmission to television set 2022.

Subscriber Management System (SMS)

A Subscriber Management System (SMS) 3004 includes a database 3024 which manages, amongst others, all of the end user files, commercial offers (such as tariffs and promotions), subscriptions, PPV details, and data regarding end user consumption and authorization. The SMS may be physically remote from the SAS.

Each SMS 3004 transmits messages to the SAS 3002 via respective linkage 3006 which imply modifications to or creations of Entitlement Management Messages (EMMs) to be transmitted to end users.

The SMS 3004 also transmits messages to the SAS 3002 which imply no modifications or creations of EMMs but imply only a change in an end user's state (relating to the authorization granted to the end user when ordering products or to the amount that the end user will be charged).

As described later, the SAS 3002 sends messages (typically requesting information such as call-back information or billing information) to the SMS 3004, so that it will be apparent that communication between the two is two-way.

Entitlement Management Messages (EMMs)

The EMM is a message dedicated to an individual end user (subscriber), or a group of end users, only (in contrast with an ECM, which is dedicated to one scrambled programme only or a set of scrambled programmes if part of the same commercial offer). Each group may contain a given number of end users. This organisation as a group aims at optimising the bandwidth; that is, access to one group can permit the reaching of a great number of end users.

Various specific types of EMM are used in putting the present invention into practice. Individual EMMs are dedicated to individual subscribers, and are typically used in the provision of Pay Per View services; these contain the group identifier and the position of the subscriber in that group. So-called "Group" subscription EMMs are dedicated to groups of, say, 256 individual users, and are typically used in the administration of some subscription services. This EMM has a group identifier and a subscribers' group bitmap. Audience EMMs are dedicated to entire audiences, and might for example be used by a particular operator to provide certain free services. An "audience" is the totality of subscribers having smartcards which bear the same Operator Identifier (OPI). Finally, a "unique" EMM is addressed to the unique identifier of the smartcard.

Figure 3:
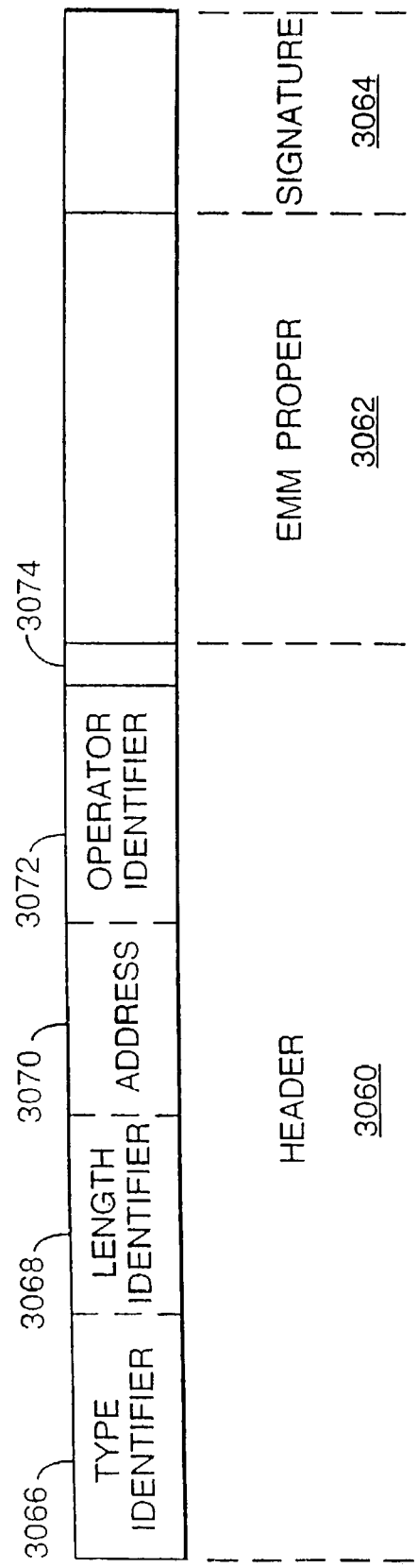
FIG. 3 shows the structure of an Entitlement Management Message used in the conditional access system.

The structure of a typical EMM is now described with reference to FIG. 3. Basically, the EMM, which is implemented as a series of digital data bits, comprises a header 3060, the EMM proper 3062, and a signature 3064. The header 3060 in turn comprises a type identifier 3066 to identify whether the type is individual, group, audience or some other type, a length identifier 3068 which gives the length of the EMM, an optional address 3070 for the EMM, an operator identifier 3072 and a key identifier 3074. The EMM proper 3062 of course varies greatly according to its type. Finally, the signature 3064, which is typically of 8 bytes long, provides a number of checks against corruption of the remaining data in the EMM.

Subscriber Authorization System (SAS)

The messages generated by the SMS 3004 are passed via linkage 3006 to the Subscriber Authorization System (SAS) 3002, which in turn generates messages acknowledging receipt of the messages generated 6y the SMS 3004 and passes these acknowledgements to the SMS 3004.

Figure 4:
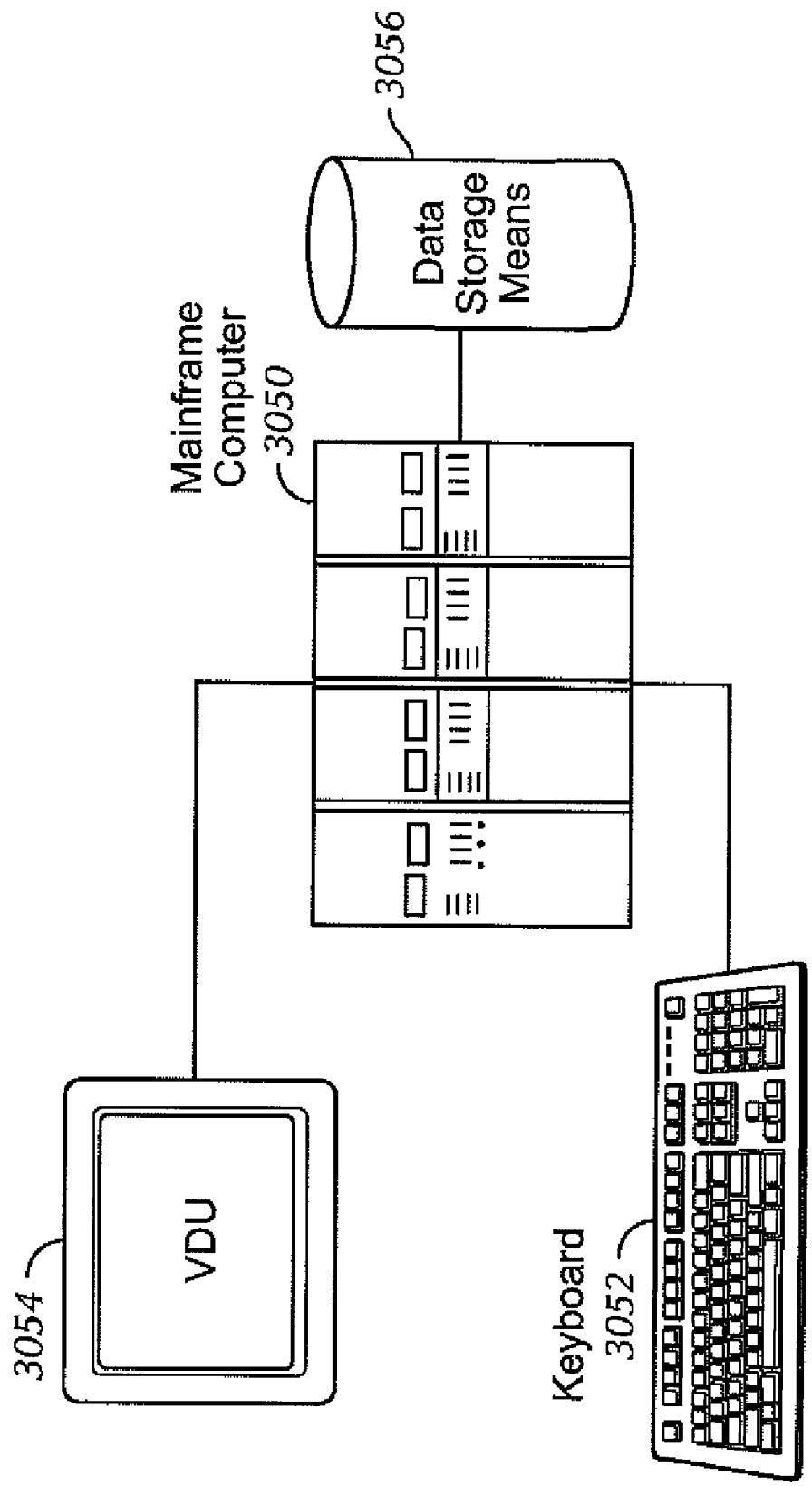
FIG. 4 is a schematic diagram of the hardware of a Subscriber Authorisation System (SAS) according to a preferred embodiment of the present invention.

As shown in FIG. 4, at the hardware level the SAS comprises in known fashion a mainframe computer 3050 (in the preferred embodiment a DEC machine) connected to one or more keyboards 3052 for data and command input, one or more Visual Display Units (VDUs) 3054 for display of output information and data storage means 3056. Some redundancy in hardware may be provided.

Figure 5:
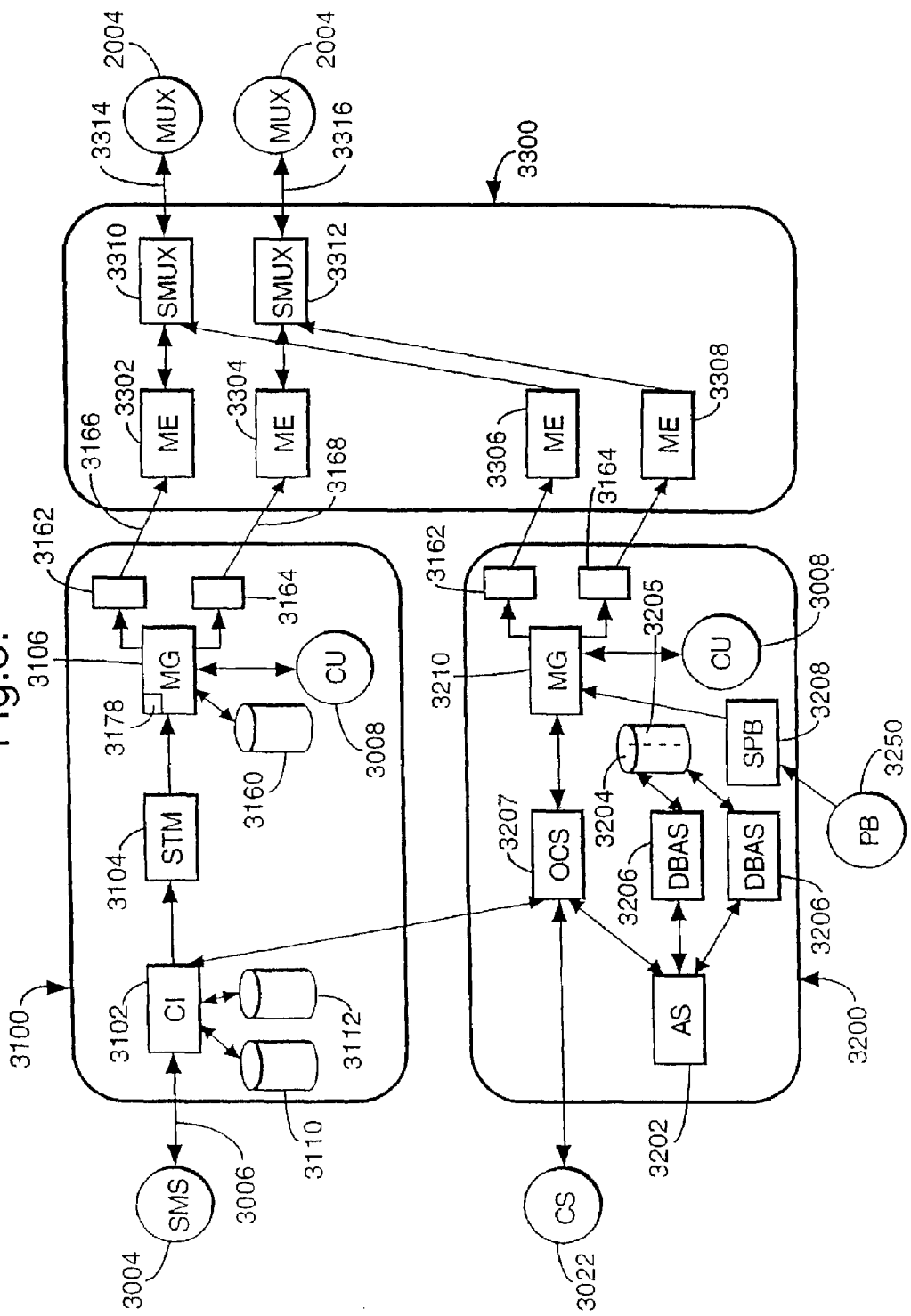
FIG. 5 is a schematic diagram of the architecture of the SAS.

At the software level the SAS runs, in the preferred embodiment on a standard open VMS operating system, a suite of software whose architecture is now described in overview with reference to FIG. 5; it will be understood that the software could alternatively be implemented in hardware.

In overview the SAS comprises a Subscription Chain area 3100 to give rights for subscription mode and to renew the rights automatically each month, a Pay Per View Chain area 3200 to give rights for PPV events, and an EMM Injector 3300 for passing EMMs created by the Subscription and PPV chain areas to the multiplexer and scrambler 2004, and hence to feed the MPEG stream with EMMs. If other rights are to be granted, such as Pay Per File (PPF) rights in the case of downloading computer software to a user's Personal Computer, other similar areas are also provided.

One function of the SAS 3002 is to manage the access rights to television programmes, available as commercial offers in subscription mode or sold as PPV events according to different modes of commercialisation (pre-book mode, impulse mode). The SAS 3002, according to those rights and to information received from the SMS 3004, generates EMMs for the subscriber.

The Subscription Chain area 3100 comprises a Command Interface (CI) 3102, a Subscriber Technical Management (STM) server 3104, a Message Generator (MG) 3106, and the Ciphering Unit 3008.

The PPV Chain area 3200 comprises an Authorisation Server (AS) 3202, a relational database 3204 for storing relevant details of the end users, a local blacklist database 3205, Database Servers 3206 for the database, an Order Centralized Server (OCS) 3207, a Server for Programme Broadcaster (SPB) 3208, a Message Generator (MG) 3210 whose function is basically the same as that for the Subscription Chain area and is hence not described further in any detail, and the Ciphering Unit 3008.

The EMM Injector 3300 comprises a plurality of Message Emitters (MEs) 3302, 3304, 3306 and 3308 and Software Multiplexers (SMUXs) 3310 and 3312. In the preferred embodiment, there are two MEs, 3302 and 3304 for the Message Generator 3106, with the other two MEs 3306 and 3308 for the Message Generator 3210. MEs 3302 and 3306 are connected to the SMUX 3310 whilst MEs 3304 and 3308 are connected to the SMUX 3312.

Each of the three main components of the SAS (the Subscription Chain area, the PPV Chain area and the EMM Injector) are now considered in more detail.

Subscription Chain Area

Considering first the Subscription Chain area 3100, the Command Interface 3102 is primarily for despatching messages from the SMS 3004 to the STM server 3104, as well as to the OCS 3206, and from the OCS to the SMS. The Command Interface takes as input from the SMS either direct commands or batch files containing commands. It performs syntactic analysis on the messages coming from the STM server, and is able to emit accurate messages when an error occurs in a message (parameter out of range, missing parameter, and so on). It traces incoming commands in textual form in a trace file 3110 and also in binary form in a replay file 3112 in order to be able to replay a series of commands. Traces can be disabled and the size of files limited.

Figure 6:
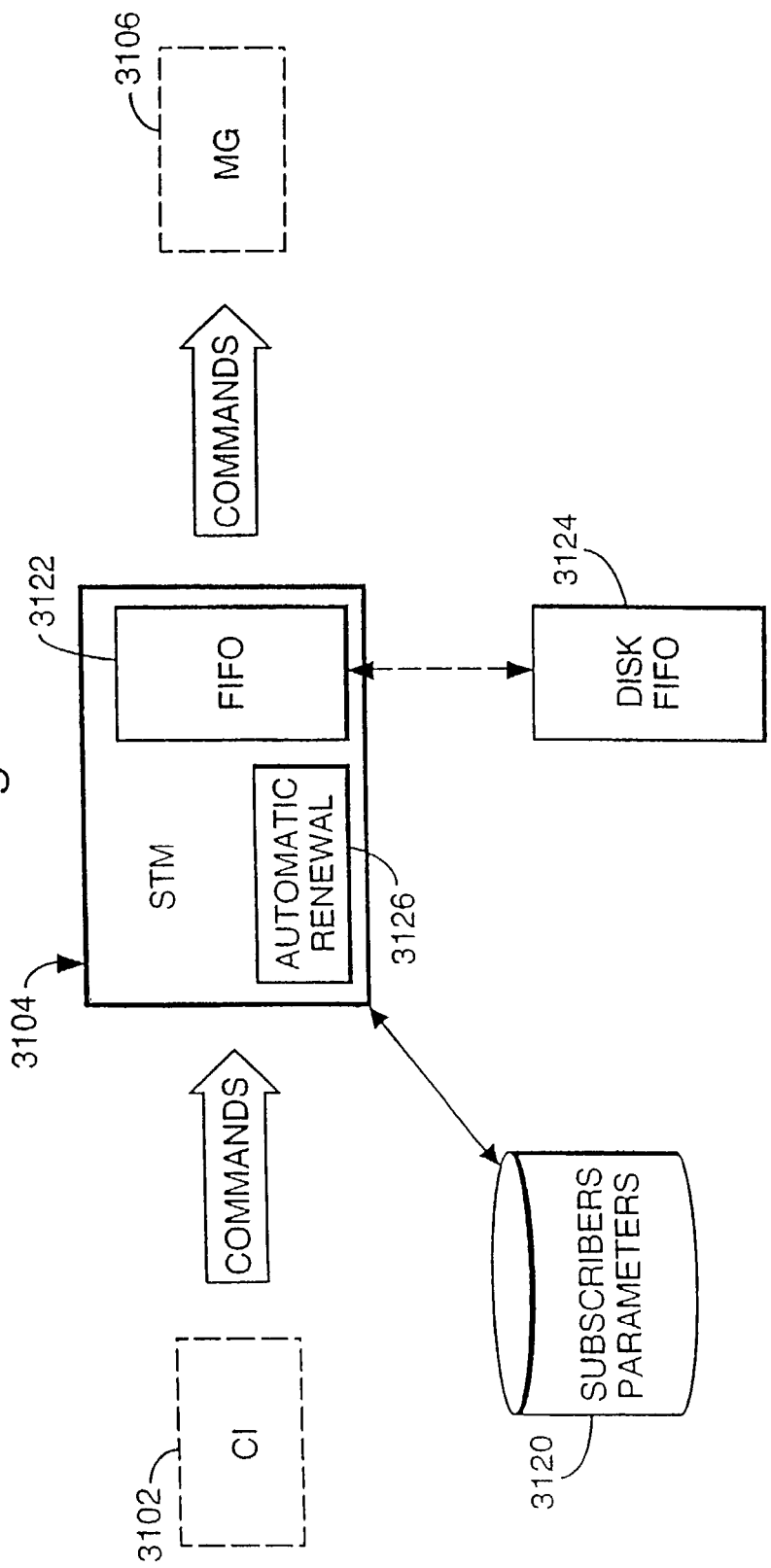
FIG. 6 is a schematic diagram of a Subscriber Technical Management server forming part of the SAS.

Detailed discussion of the STM server 3104 is now provided with particular reference to FIG. 6. The STM server is effectively the main engine of the Subscription Chain area, and has the purpose of managing free rights, the creation of new subscribers and the renewal of existing subscribers. As shown in the figure, commands are passed on to the Message Generator 3106, albeit in a different format from that in which the commands are passed to the STM server. For each command, the STM server is arranged to send an acknowledgement message to the CI only when the relevant command has been successfully processed and sent to the MG.

The STM server includes a subscriber database 3120, in which all the relevant parameters of the subscribers are stored (smartcard number, commercial offers, state, group and position in the group, and so on). The database performs semantic checks of the commands sent by the CI 3102 against the content of the database, and updates the database when the commands are valid.

The STM server further manages a First In First Out (FIFO) buffer 3122 between the STM server and the MG, as well as a backup disk FIFO 3124. The purpose of the FIFOs is to average the flow of commands from the CI if the MG is not able to respond for a while for any reason. They can also ensure that in the case of a crash of the STM server or MG no command will be lost, since the STM server is arranged to empty (that is, send to the MG) its FIFOs when restarted. The FIFOs are implemented as files.

The STM server includes at its core an automatic renewal server 3126 which automatically generates renewals, and, if required by the operators, free rights. In this context, the generation of renewals may be thought of as including the generation of rights for the first time, although it will be understood that the generation of new rights is initiated at the SMS. As will become apparent, the two can be treated by roughly the same commands and EMMs.

Having the STM separate from the SAS, and the automatic renewal server within the SAS rather than (in known systems) in the SMS 3004, is a particularly important feature, since it can significantly reduce the number of commands which need to be passed from the SMS to the SAS (bearing in mind that the SMS and SAS may be in different locations and operated by different operators). In fact, the two main commands required from the SMS are merely commands that a new subscription should be started and that an existing subscription should be stopped (for example in the case of non-payment). By minimising command exchange between the SMS and SAS, the possibility of failure of command transfer in the linkage 3006 between the two is reduced; also, the design of the SMS does not need to take into account the features of the conditional access system 3000 generally.

Figure 7:
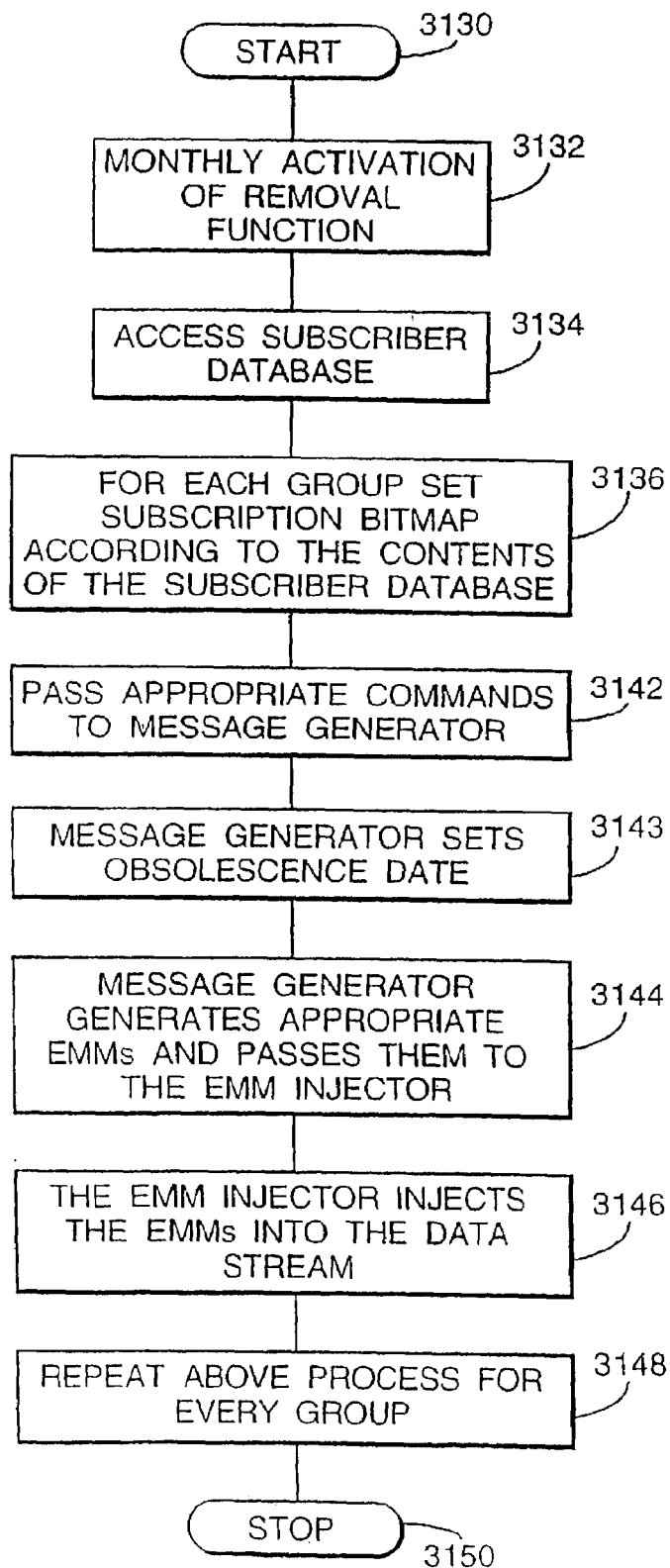
FIG. 7 is a flow diagram of the procedure for automatic renewal of subscriptions as implemented by the SAS.

Automatic renewal proceeds in the fashion indicated in the flow diagram of FIG. 7. In order to reduce bandwidth, and given that a very high percentage of all renewals are standard, renewal proceeds in groups of subscribers; in the preferred embodiments there are 256 individual subscribers per group. The flow diagram begins with the start step 3130, and proceeds to step 3132 where a monthly activation of the renewal function is made (although of course it will be appreciated that other frequencies are also possible). With a monthly frequency, rights are given to the end user for the current month and all of the following month, at which point they expire if not renewed.

In step 3134 the subscriber database 3120 is accessed in respect of each group and each individual within that group to determine whether rights for the particular individual are to be renewed.

In step 3136, a group subscription bitmap is set up according to the contents of the subscriber database, as shown in FIG. 8. The bitmap comprises a group identifier (in this case Group 1—"G1") 3138 and 256 individual subscriber zones 3140. The individual bits in the bitmap are set to 1 or zero according to whether or not the particular subscriber is to have his rights renewed. A typical set of binary data is shown in the figure.

In step 3142 the appropriate commands, including the group subscription bitmap, are passed to the Message Generator 3106. In step 3143 the Message Generator sets an obsolescence date to indicate to the smartcard the date beyond which the particular subscription EMM is not valid; typically this date is set as the end of the next month.

In step 3144 the Message Generator generates from the commands appropriate group subscription EMMs and asks the Ciphering Unit 3008 to cipher the EMMs, the ciphered EMMs being then passed to the EMM Injector 3300, which, in step 3146, injects the EMMs into the MPEG-2 data stream.

Step 3148 indicates that the above described procedure is repeated for each and every group. The process is finally brought to an end at stop step 3150.

The flow diagram described above with reference to FIG. 7 relates in fact specifically to the renewal of subscriptions. The STM also manages in a similar way free audience rights and new subscribers.

In the case of free audience rights, available for specific television programmes or groups of such programmes, these are made available by the STM issuing a command to the Message Generator to generate appropriate audience EMMs (for a whole audience) with an obsolescence date a given number of days (or weeks) hence. The MG computes the precise obsolescence date based on the STM command.

In the case of new subscribers, these are dealt with in two stages. Firstly, on purchase the smartcard in the receiver/decoder 2020 (if desired by the operator) affords the subscriber free rights for a given period (typically a few days). This is achieved by generating a bitmap for the subscriber which includes the relevant obsolescence date.

The subscriber then passes his completed paperwork to the operator managing the subscriber (at the SMS). Once the paperwork has been processed, the SMS supplies to the SAS a start command for that particular subscriber. On receipt by the SAS of the start command, the STM commands the MG to assign a unique address to the new subscriber (with a particular group number and position within the group) and to generate a special, so-called "commercial offer" subscription EMM (as opposed to the more usual "group" subscription EMM used for renewals) to provide the particular subscriber with rights until the end of the next month. From this point renewal of the subscriber can occur automatically as described above. By this two stage process it is possible to grant new subscribers rights until the SMS issues a stop command.

It is to be noted that the commercial offer subscription EMM is used for new subscribers and for reactivation of existing subscribers. The group subscription EMM is used for renewal and suspension purposes.

With reference to FIG. 9, a typical subscription EMM proper (that is, ignoring the header and signature) generated by the above procedure comprises the following main portions, namely typically a 256 bit subscription (or subscribers' group) bitmap 3152, 128 bits of management ciphering keys 3154 for the ciphering of the EMM, 64 bits of each exploitation ciphering key 3156 to enable the smartcard 3020 to decipher a control word to provide access to broadcast programmes, and 16 bits of obsolescence date 3158 to indicate the date beyond which the smartcard will ignore the EMM. In fact in the preferred embodiment three exploitation keys are provided, one set for the present month, one set for the next month, and one for resume purposes in the event of system failure.

In more detail, the group subscription EMM proper has all of the above components, except the management ciphering keys 3154. The commercial offer subscription EMM proper (which is for an individual subscriber) includes instead of the full subscribers' group bitmap 3152 the group ID followed by the position in the group, and then management ciphering keys 3154 and three exploitation keys 3156, followed by the relevant obsolescence date 3158.

The Message Generator 3106 serves to transform commands issued by the STM server 3104 into EMMs for passing to the Message Emitter 3302. With reference to FIG. 5, firstly, the MG produces the EMMs proper and passes them to the Ciphering Unit 3008 for ciphering with respect to the management and exploitation keys. The CU completes the signature 3064 on the EMM (see FIG. 3) and passes the EMM back to the MG, where the header 3060 is added. The EMMs which are passed to the Message Emitter are thus complete EMMs. The Message Generator also determines the broadcast start and stop time and the rate of emission of the EMMs, and passes these as appropriate directions along with the EMMs to the Message Emitter. The MG only generates a given EMM once; it is the ME which performs its cyclic transmission.

Again with reference to FIG. 5, the Message Generator includes its own EMM database 3160 which, for the lifetime of the relevant EMM, stores it. It is erased once its emission duration has expired. The database is used to ensure consistency between the MG and ME, so that for example when an end user is suspended the ME will not continue to send renewals. In this regard the MG computes the relevant operations and sends them to the ME.

On generation of an EMM, the MG assigns a unique identifier to the EMM. When the MG passes the EMM to the ME, it also passes the EMM ID. This enables identification of a particular EMM at both the MG and the ME.

Also concerning the Subscription Chain area, the Message Generator includes two FIFOs 3162 and 3164, one for each of the relevant Message Emitters 3302 and 3304 in the EMM Injector 3300, for storing the ciphered EMMs. Since the Subscription Chain area and EMM Injector may be a significant distance apart, the use of FIFOs can allow full continuity in EMM transmission even if the links 3166 and 3168 between the two fail. Similar FIFO's are provided in the Pay Per View Chain area.

One particular feature of the Message Generator in particular and the conditional access system in general concerns the way that it reduces the length of the EMM proper 3062 by mixing parameter length and identifier to save space. This is now described with reference to FIG. 10 which illustrates an exemplary EMM (in fact a PPV EMM, which is the simplest EMM). The reduction in length occurs in the Pid (Packet or "Parameter" identifier) 3170. This comprises two portions, the actual ID 3172, and the length parameter for the packet 3174 (necessary in order that the start of the next packet can be identified). The whole Pid is expressed in just one byte of information, 4 bits being reserved for the ID, and four for the length. Because 4 bits is not sufficient to define the length in true binary fashion, a different correspondence between the bits and the actual length is used, this correspondence being represented in a look-up table, stored in storage area 3178 in the Message Generator (see FIG. 5). The correspondence is typically as follows:—

```
0000 = 0
0001 = 1
0010 = 2
0011 = 3
0100 = 4
0101 = 5
0110 = 6
0111 = 7
1000 = 8
1001 = 9
1010 = 10
1011 = 11
1100 = 12
1101 = 16
1110 = 24
1111 = 32
```

It will be seen that the length parameter is not directly proportional to the actual length of the packet; the relationship is in part more quadratic rather than linear. This allows for a greater range of packet length.

Pay Per View Chain Area

Concerning the Pay Per View Chain area 3200, with reference to FIG. 5 in more detail the Authorisation Server 3202 has as its client the Order Centralized Server 3207, which requests information about each subscriber which connects to the Communications Servers 3022 to purchase a PPV product.

If the subscriber is known from the AS 3202, a set of transactions takes place. If the subscriber is authorized for the order, the AS creates a bill and sends it to the OCS. Otherwise, it signals to the OCS that the order is not authorized.

It is only at the end of this set of transactions that the AS updates the end users database 3204 via the database servers (DBAS) 3206, if at least one transaction was authorized; this optimizes the number of database accesses.

The criteria according to which the AS authorizes purchase are stored in the database, accessed through DBAS processes. In one embodiment, the database is the same as the database accessed by the STM.

Depending on consumer profile, the authorization may be denied (PPV_Forbidden,Casino_Forbidden ... ). These kind of criteria are updated by STM 3104, on behalf of the SMS 3004.

Other parameters are checked, such as limits allowed for purchase (either by credit card, automatic payment, or number of authorized token purchases per day).

In case of payment with a credit card, the number of the card is checked against a local blacklist stored in the local blacklist database 3205.

When all the verifications are successful, the AS:—

1. Generates a bill and sends it to the OCS, which completes this bill and stores it in a file, this file being later sent to the SMS for processing (customer actual billing); and 2. Updates the database, mainly to set new purchase limits.

This check-and-generate-bill-if-OK mechanism applies for each command a subscriber may request during a single connection (it is possible to order e.g. 5 movies in a single session).

It is to be noted that the AS has a reduced amount of information concerning the subscriber, by comparison with that held by the SMS. For example, the AS does not hold the name or address of the subscriber. On the other hand, the AS does hold the smartcard number of the subscriber, the subscriber's consumer category (so that different offers can be made to different subscribers), and various flags which state whether, for example, the subscriber may purchase on credit, or he is suspended or his smartcard has been stolen. Use of a reduced amount of information can help to reduce the amount of time taken to authorize a particular subscriber request.

The main purpose of the DBASs 3206 is to increase database performance seen from the AS, by paralleling the accesses (so actually it does not make much sense to define a configuration with only one DBAS). An AS parameter determines how many DBAScs should connect. A given DBAS may be connected to only one AS.

The OCS 2307 mainly deals with PPV commands. It operates in several modes.

Firstly, it operates to process commands issued by the SMS, such as product refreshment (for instance, if the bill is already stored by the SMS, no bill is generated by the OCS), update of the wallet in the smartcard 3020, and session cancellation/update.

The various steps in the procedure are:—

1. Identifying the relevant subscriber (using the AS 3202);

2. If valid, generate adequate commands to the Message Generator, in order to send an appropriate EMM. Commands may be:
  Product commands,
  Update of the wallet,
  Session erasure.

Note that these operations do not imply creation of billing information, since billing is already known from the SMS. These operations are assimilated to "free products" purchase.

Secondly, the OCS deals with commands received from the subscribers through the Communications Servers 3022. These may be received either via a modem connected to the receiver/decoder 2020, or by voice activation via the telephone 4001, or by key activation via a MINITEL, PRESTEL or like system where available.

Thirdly, the OCS deals with callback requests issued by the SMS. These last two modes of operation are now discussed in more detail.

In the second type of mode described above it was stated that the OCS deals with commands received directly from the end user (subscriber) through the Communications Servers 3022. These include product orders (such as for a particular PPV event), a subscription modification requested by the subscriber, and a reset of a parental code (a parental code being a code by which parents may restrict the right of access to certain programmes or classes of programmes).

Figure 11:
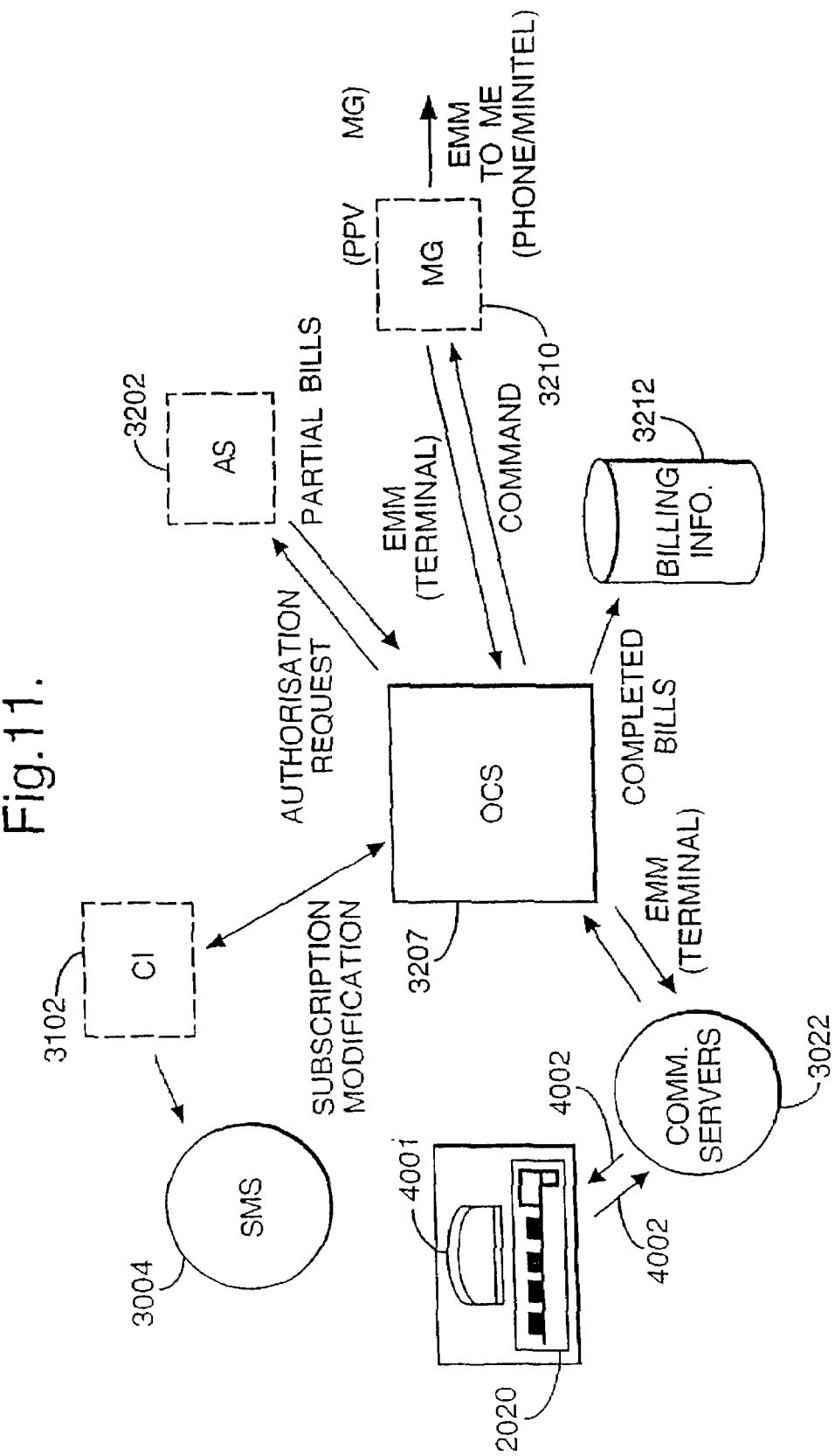
FIG. 11 is a schematic diagram of an order centralized server when used to receive commands directly through communications servers.

The way in which these commands are dealt with is now described in more detail with reference to FIG. 11.

Product orders by a subscriber involve the following steps:

1. Identifying through the AS the caller who is making a call through the CS 3022 ordering a particular product;
2. Checking the caller's request validity, again using the AS (where the order is placed using the receiver/decoder 2020, this is achieved by verifying the smartcard 3020 details);
3. Ascertain the price of the purchase;
4. Check that the price does not exceed the caller's credit limit etc;
5. Receiving a partial bill from the AS;
6. Filling additional fields in the bill to form a completed bill;
7. Adding the completed bill to a billing information storage file 3212 for later processing; and
8. Sending corresponding command(s) to the PPV Message Generator 3210 to generate the relevant EMM(s).

The EMM(s) is sent either on the modem line 4002 if the consumer placed the product order using the receiver/decoder 2020 (more details of this are described later), or else it is broadcast. The one exception to this is where there is some failure of the modem connection (in the case where the consumer places the order using the receiver/decoder); in this event the EMM is broadcast over the air.

A subscription modification requested by a subscriber involves:

1. Identifying the caller (using the AS);
2. Sending information to the Command Interface; the CI in turn forwards this information to the SMS; and
3. Via the CI, the OCS then receives an answer from the SMS (in terms of the cost of the modification, if the modification is possible).

If modification was requested using the receiver/decoder, the OCS generates a confirmation to the SMS. Otherwise, for example in the case of phone or Minitel, the subscriber is prompted for confirmation and this answer sent to the SMS via the OCS and the CI.

Reset of a parental code involves:

1. Identifying the caller (using AS); and

2. Sending a command to the MG to generate an appropriate EMM bearing an appropriate reset password.

In the case of reset of parental code, the command to reset the code is for security reasons not permitted to originate from the receiver/decoder. Only the SMS, telephone and MINITEL or like can originate such a command. Hence in this particular case the EMM(s) are broadcast only on air, never on the telephone line.

It will be understood from the above examples of different modes of operation of the OCS that the user can have direct access to the SAS, and in particular the OCS and AS, in that the Communications Servers are directly connected to the SAS, and in particular the OCS. This important feature is concerned with reducing the time for the user to communicate his command to the SAS.

Figure 12:
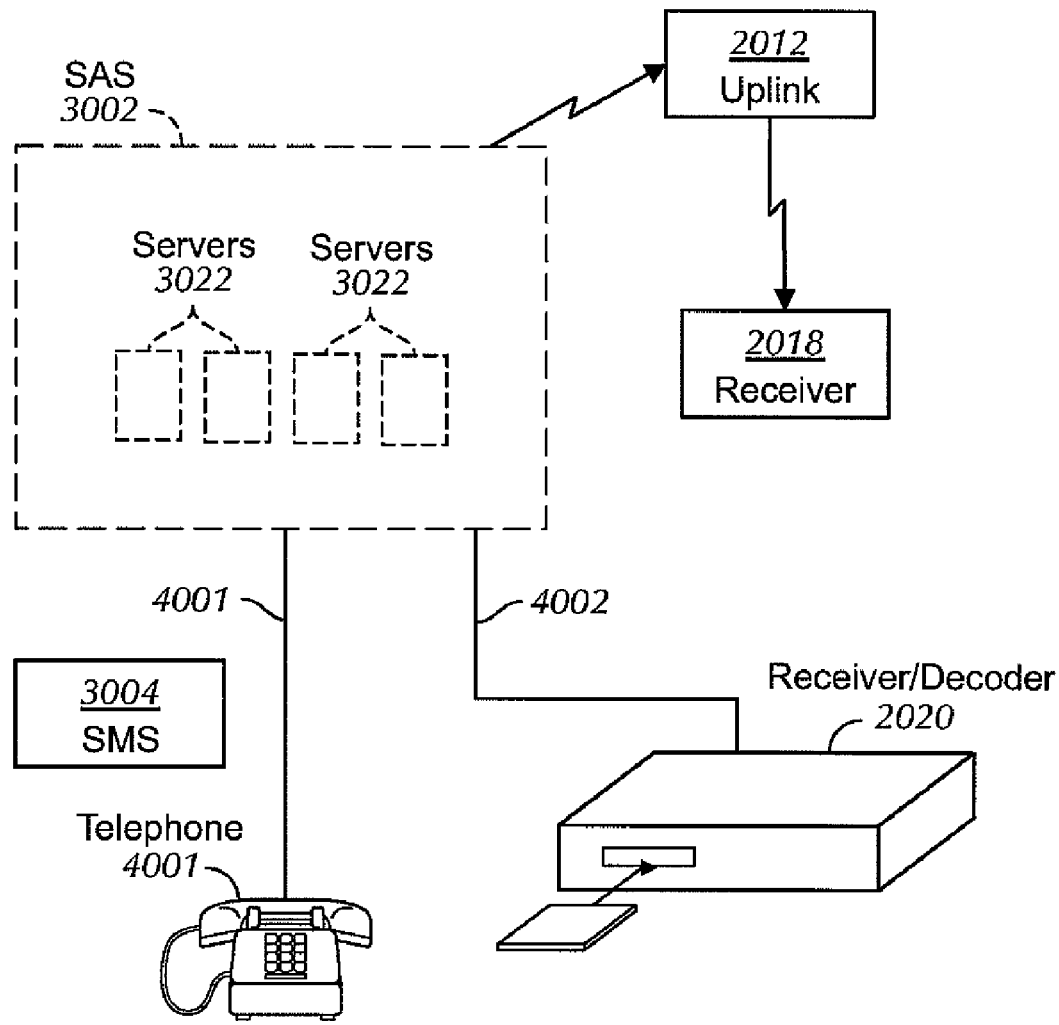
FIG. 12 illustrates diagrammatically a part of FIG. 2 showing one embodiment of the present invention.

This feature is illustrated further with reference to FIG. 12, from which it can be seen that the end user's Set-Top-Box, and in particular its receiver/decoder 2020, has the capability of communicating directly with the Communications Servers 3022 associated with the SAS 3002. Instead of the connection from the end user to the Communications Servers 3022 of the SAS 3002 being through the SMS 3004 the connection is directly to the SAS 3002.

In fact, as directly mentioned two direct connections are provided.

The first direct connection is by a voice link via a telephone 4001 and appropriate telephone line (and/or by MINITEL or like connection where available) where the end users still have to input a series of voice commands or code numbers but time is saved compared with the communication being via the SMS 3004.

The second direct connection is from the receiver/decoder 2020 and the input of data is achieved automatically by the end user inserting his own daughter smartcard 3020 thus relieving the end user of the job of having to input the relevant data which in turn reduces the time taken and the likelihood of errors in making that input.

A further important feature which arises out of the above discussion is concerned with reducing the time taken for the resulting EMM to be transmitted to the end user in order to initiate viewing by the end user of the selected product.

In broad terms, and with reference to FIG. 12, the feature is again achieved by providing the end user's receiver/decoder 2020 with the capability of communicating directly with the Communications Servers 3022 associated with the SAS 3002.

As described earlier the integrated receiver/decoder 2020 is connected directly to the Communications Servers 3022 by the modemmed back channel 4002 so that commands from the decoder 2020 are processed by the SAS 3002, messages generated (including EMMs) and then sent back directly to the decoder 2020 through the back channel 4002. A protocol is used in the communication between the CS 3022 and the receiver/decoder 2020 (as described later), so that the CS receive acknowledgement of receipt of the relevant EMM, thereby adding certainty to the procedure.

Thus, for example, in the case of a pre-book mode the SAS 3002 receives messages from the end user via the smartcard and decoder 2020 via its modem and via the telephone line 4002, requesting access to a specific event/product, and returns a suitable EMM via the telephone line 4002 and modem to the decoder 2020, the modem and decoder being preferably located together in a Set-Top-Box (SIT). This is thus achieved without having to transmit the EMM in the MPEG-2 data stream 2002 via the multiplexer and scrambler 2004, the uplink 2012, satellite 2014 and datalink 2016 to enable the end user to view the event/product. This can save considerably on time and bandwidth. Virtual certainty is provided that as soon as the subscriber has paid for his purchase the EMM will arrive at the receiver/decoder 2020.

Figure 13:
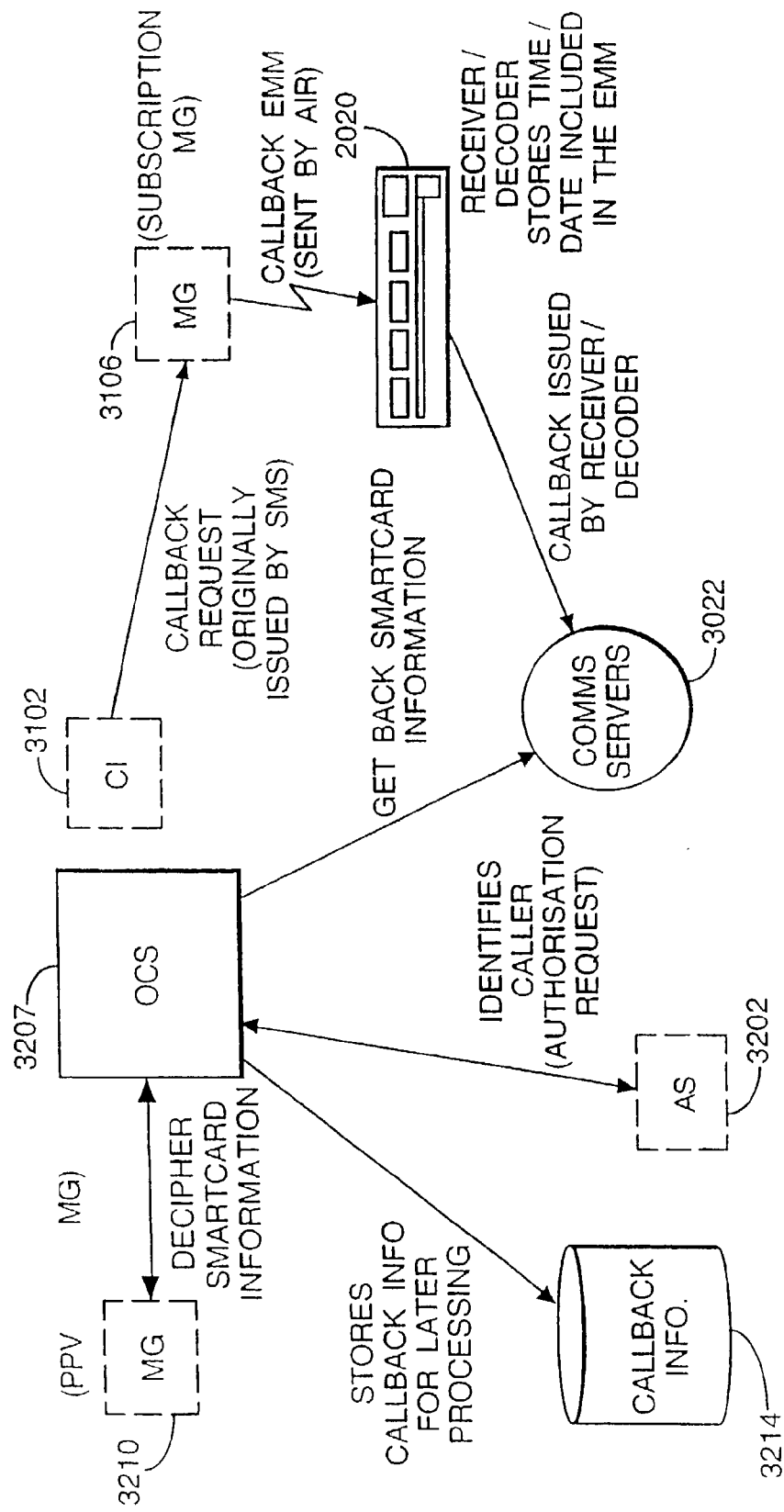
FIG. 13 is a schematic diagram of the order centralized server when used to receive commands from the subscriber authorization system to request a callback.

In the third type of mode of operation of the OCS 3207 described above, the OCS deals with callback requests issued by the SAS. This is illustrated with reference to FIG. 13. Typical callback requests have the purpose of ensuring that the receiver/decoder 2020 calls back the SAS via the modemmed back channel 4002 with the information that the SAS requires of the receiver/decoder.

As instructed by the Command Interface 3102, the subscription chain Message Generator 3106 generates and sends to the receiver/decoder 202 a callback EMM. This EMM is ciphered by the Ciphering Unit 3008 for security reasons. The EMM may contain the time/date at which the receiver/decoder should wake up and perform a callback on its own, without being explicitly solicited; the EMM may also typically contain the phone numbers which the terminal must dial, the number of further attempts after unsuccessful calls and the delay between two calls.

When receiving the EMM, or at the specified time-date; the receiver/decoder connects to the Communications Servers 3022. The OCS 3207 first identifies the caller, using the AS 3202, and verifies certain details, such as smartcard operator and subscriber details. The OCS then asks the smartcard 3020 to send various ciphered information (such as the relevant session numbers, when the session was watched, how many times the subscriber is allowed to view the session again; the way in which the session was viewed, the number of remaining tokens, the number of prebooked sessions, etc). This information is deciphered by the PPV chain Message Generator 3210, again using the Ciphering Unit 3008. The OCS adds this information to a callback information storage file 3214 for later processing and passing to the SMS 3004. The information is ciphered for security reasons. The whole procedure is repeated until there is nothing more to be read from the smartcard.

One particular preferred feature of the callback facility is that before reading the smartcard (so just after the identification of the caller using the AS 3202 as described above) a check is made by the SAS 3002 that the receiver/decoder is indeed a genuine one rather than a pirated version or computer simulation. Such a check is carried out in the following manner. The SAS generates a random number, which is received by the receiver/decoder, ciphered, and then returned to the SAS. The SAS deciphers this number. If the deciphering is successful and the original random number is retrieved, it is concluded that the receiver/decoder is genuine, and the procedure continues. Otherwise, the procedure is discontinued.

Other functions which may occur during the callback are erasure of obsolete sessions on the smartcard, or filling of the wallet (this latter also being described later under the section entitled "Smartcard").

Also as regards the Pay Per View Chain area 3200, description is now made of the Communications Servers 3022. At the hardware level, these comprise in the preferred embodiment a DEC Four parallel processor machine. At the software architecture level, with reference to FIG. 14, in many respects the Communications Servers are conventional. One particular divergence from conventional designs arises from the fact that the Servers must serve both receiver/decoders 2020 and voice communication with conventional telephones 4001, as well possibly as MINITEL or like systems.

Figure 14:
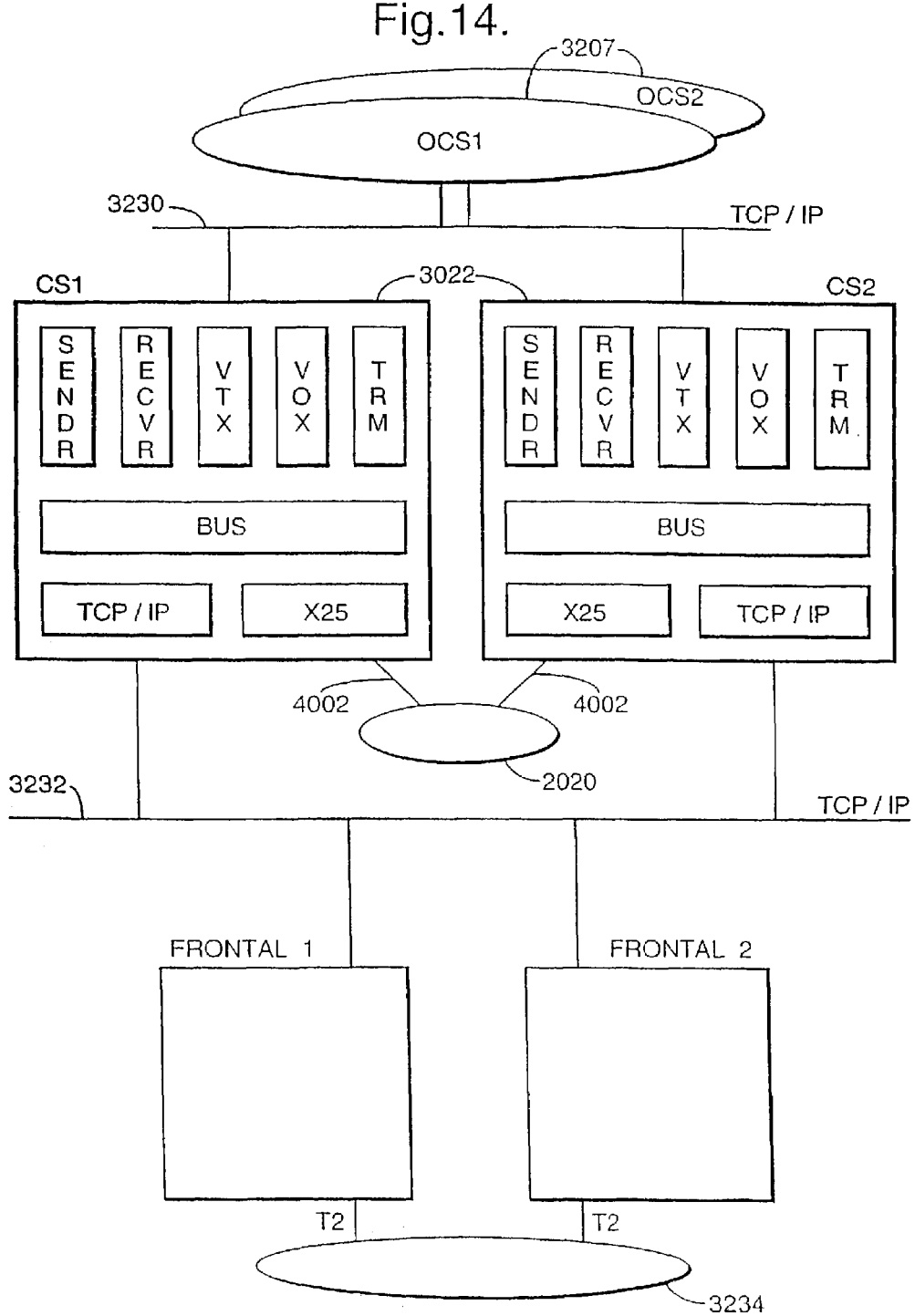
FIG. 14 is a schematic diagram of the communications servers.

It will be noted in passing that two Order Centralized Servers 3207 are shown in FIG. 14 (as "OCS1" and "OCS2"). Naturally any desired number may be provided.

The Communication Servers include two main servers ("CS1" and "CS2") as well as a number of frontal servers ("Frontal 1" and "Frontal 2"); whilst two frontal servers are shown in the figure, typically 10 or 12 may be provided per main server. Indeed, although two main servers CS1 and CS2 and two frontal servers, Frontal 1 and Frontal 2, have been shown, any number could be used. Some redundancy is usually desirable.

CS1 and CS2 are coupled to OCS1 and OCS2 via high level TCP/IP links 3230, whilst CS1 and CS2 are coupled to Frontal 1 and Frontal 2 via further TCP/IP links 3232.

As illustrated, CS1 and CS2 comprise servers for "SENDR" (transmission), "RECVR" (reception), "VIX" (MINITEL, PRESTEL or the like), "VOX" (voice communication), and "TRM" (communication with the receiver/decoder). These are coupled to the "BUS" for communication of signals to the Frontal servers.

CS1 and CS2 communicate directly with the receiver/decoders 2020 via their modemmed back channels 4002 using the X25 public network common protocol. The relatively low-level protocol between the Communications Servers 3022 and the receiver/decoders 3020 is in one preferred embodiment based upon the V42 standard international CCITT protocol, which provides reliability by having error detection and data re-transmission facilities, and uses a checksum routine to check the integrity of the re-transmission. An escape mechanism is also provided in order to prevent the transmission of disallowed characters.

On the other hand, voice telephone communication is carried out via the Frontal Communications Servers, each capable of picking up, say, 30 simultaneous voice connections from the connection 3234 to the local telephone network via the high speed "T2" (E1) standard telephony ISDN lines.

Three particular functions of the software portion of the Communications Servers (which could of course alternatively be implemented fully in hardware) are firstly to convert the relatively low level protocol information received from the receiver/decoder into the relatively high level protocol information output to the OCS, secondly to attenuate or control the number of simultaneous connections being made, and thirdly to provide several simultaneous channels without any mixing. In this last regard, the Communications Servers play the role of a form of multiplexer, with the interactions in a particular channel being defined by a given Session ID (identifier), which is in fact used throughout the communication chain.

Finally as regards the Pay Per View Chain area 3200, and with reference again to FIG. 5, the Server for Programme Broadcast (SPB) 3208 is coupled to one or more Programme Broadcasters 3250 (which would typically be located remotely from the SAS) to receive programme information. The SPB filters out for further use information corresponding to PPV events (sessions).

A particularly important feature is that the filtered programme event information is passed by the SPB to the MG which in turn sends a directive (control command) to the ME to change the rate of cyclic emission of the EMMs in given circumstances; this is done by the ME finding all EMMs with the relevant session identifier and changing the cycle rate allocated to such EMMs. This feature might be thought of as a dynamic allocation of bandwidth for specific EMMs. Cyclic EMM emission is discussed in more detail in the section below concerned with the EMM Injector.

Figure 15:
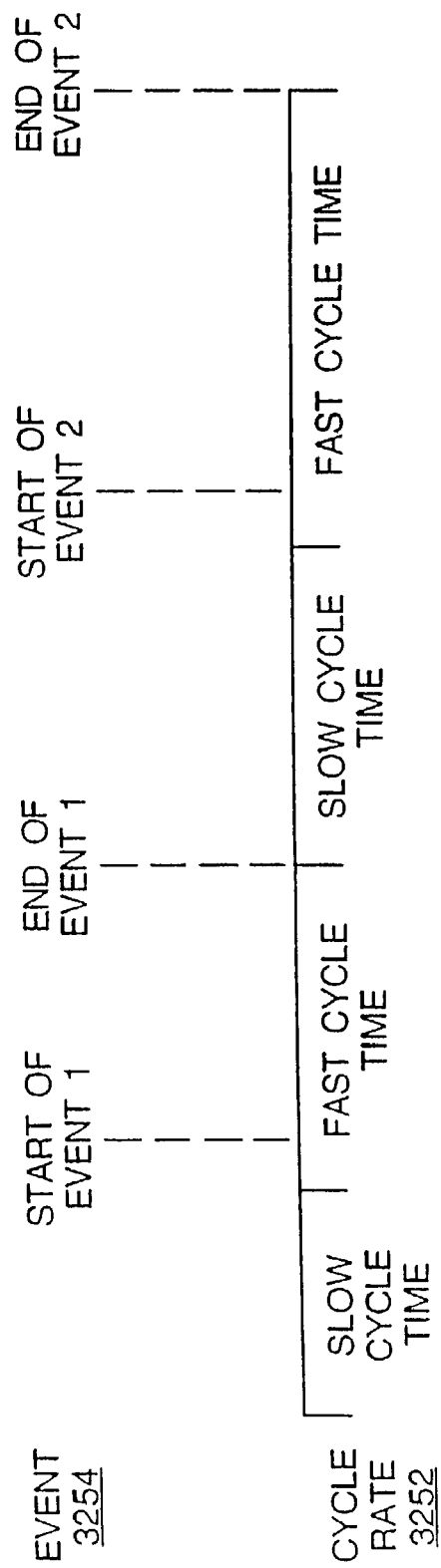
FIG. 15 shows the manner in which EMM emission cycle rate is varied according to the timing of a PPV event.

The circumstances in which the cycle rate is changed are now described with reference to FIG. 15, which demonstrates how cycle rate 3252 is raised a short while (say 10 minutes) before a particular PPV programme event until the end of the event from a slow cycle rate of say once every 30 minutes to a fast cycle rate of say once every 30 seconds to 1 minute in order to meet the anticipated extra user demand for PPV events at those times. In this way bandwidth can be allocated dynamically according to the anticipated user demand. This can assist in reducing the overall bandwidth requirement.

The cycle rate of other EMMs may also be varied. For example the cycle rate of subscription EMMs may be varied by the Multiplexer and Scrambler 2004 sending the appropriate bitrate directive.

EMM Injector

Figure 16:
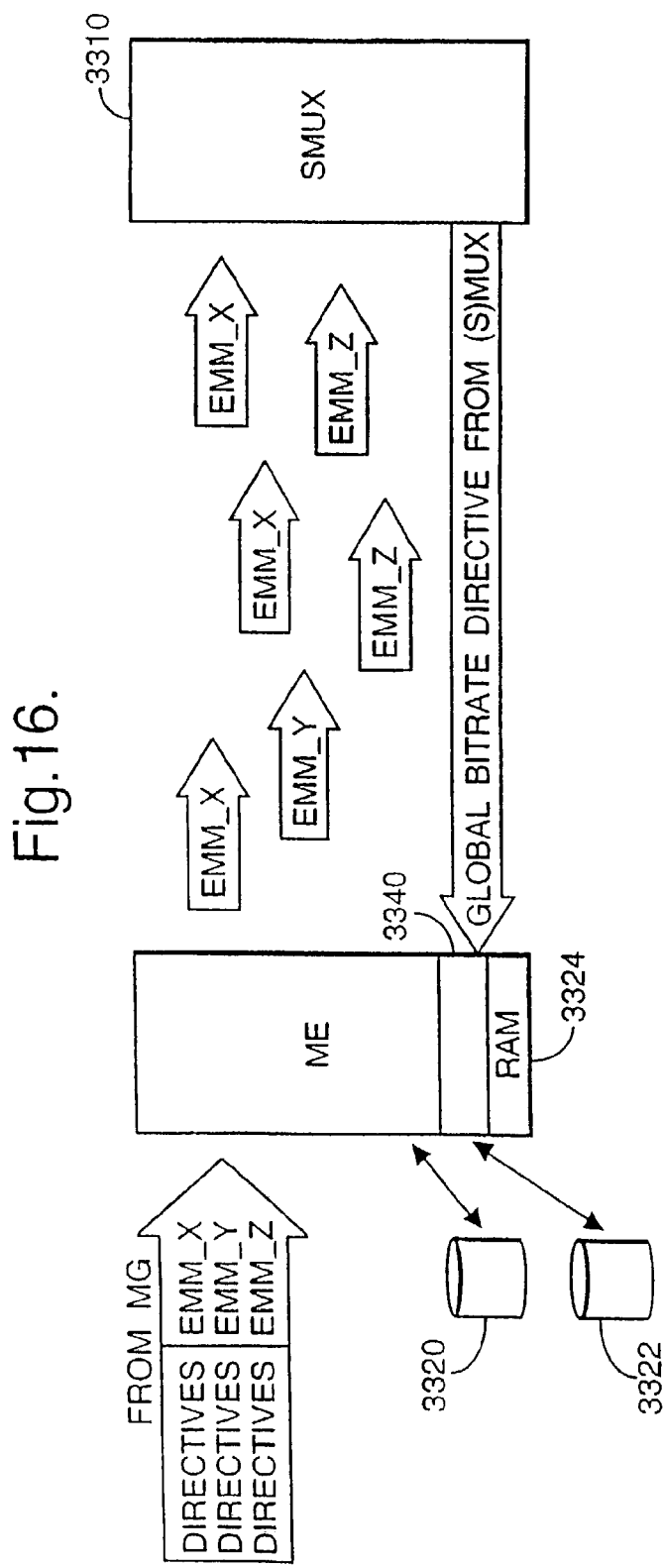
FIG. 16 is a schematic diagram of a Message Emitter used to emit EMMs.

Concerning the EMM Injector 3300, details of the Message Emitters 3302 to 3308, forming part of the EMM Injector and acting as output means for the Message Generator, are now described with reference to FIG. 16. Their function is take the EMMs and to pass them cyclically (in the manner of a carousel) via respective links 3314 and 3316 to the Software Multiplexers 3310 and 3312 and thence to the hardware multiplexers and scramblers 2004. In return the software multiplexers and scramblers 2004 generate a global bitrate directive to control the overall cycling rate of the EMMs; to do so, the MEs take into account various parameters such as the cycle time, the size of EMM, and so on. In the figure, EMM_X and EMM_Y are group EMMs for operators X and Y, whilst EMM_Z are other EMMs for either operator X or operator Y.

Further description proceeds for an exemplary one of the Message Emitters; it will be appreciated that the remaining MEs operate in similar fashion. The ME operates under control of directives from the MG, most notably transmission start and stop time and emission rate, as well as session number if the EMM is a PPV EMM. In relation to the emission rate, in the preferred embodiment the relevant directive may take one of five values from Very fast to Very slow. The numeric values are not specified in the directive, but rather the ME maps the directive to an actual numeric value which is supplied by the relevant part of the SAS. In the preferred embodiment, the 5 emission rates are as follows:—

| 1. | Very fast | every 30 seconds |
| 2. | Fast | every minute |
| 3. | Medium | every 15 minutes |
| 4. | Slow | every 30 minutes |
| 5. | Very slow | every 30 minutes |

The ME has first and second databases 3320 and 3322. The first database is for those EMMs which have not yet achieved their broadcast date; these are stored in a series of chronological files in the database. The second database is for EMMs for immediate broadcast. In the event of a system crash, the ME is arranged to have the ability to re-read the relevant stored file and perform correct broadcast. All the files stored in the databases are updated upon request from the MG, when the MG wishes to maintain consistency between incoming directives and EMMs already sent to the NE. The EMMs actually being broadcast are also stored in Random Access Memory 3324.

A combination of the FIFOs 3162 and 3164 in the Message Generator and the databases 3320 and 3322 in the Message Emitter means that the two can operate in standalone mode if the link 3166 between them is temporarily broken; the ME can still broadcast EMMs.

The Software Multiplexers (SMUX) 3310 and 3312 provide an interface between the MEs and the hardware multiplexers 2004. In the preferred embodiment, they each receive EMMs from two of the MEs, although in general there is no restriction on the number of MEs that can be connected with one SMUX. The SMUXs concentrate the EMMs and then pass them according to the type of EMM to the appropriate hardware multiplexer. This is necessary because the hardware multiplexers take the different types of EMMs and place them at different places in the MPEG-2 stream. The SMUX's also forward global bitrate directives from the hardware multiplexers to the MEs.

One particularly important feature of the ME is that it emits EMMs in random order. The reason for this is as follows. The Message Emitter has no ability to sense or control what it emits to the multiplexer. Hence it is possible that it may transmit two EMMs which are to be received and decoded by the receiver/decoder 2020 back to back. In such circumstances, further, it is possible that if the EMMs are insufficiently separated the receiver/decoder and smartcard will be unable to sense and decode properly the second of the EMMs. Cyclically emitting the EMMs in random order can solve this problem.

Figure 17:
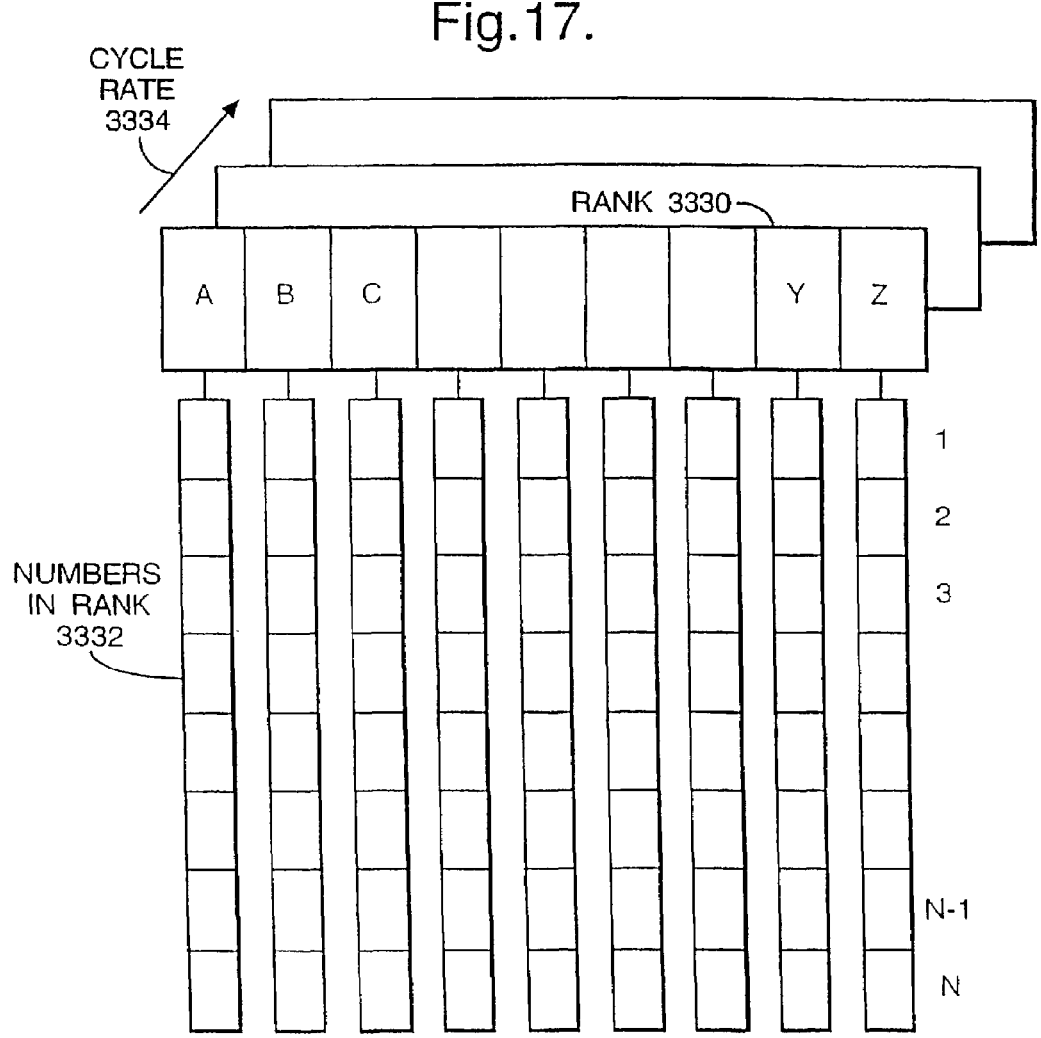
FIG. 17 is a schematic diagram showing the manner of storage of EMMs within the Message Emitter.

The manner in which randomization is achieved is now described with reference to FIG. 17; in the preferred embodiment the necessary software logic is implemented in the ADA computer language. A particularly important part of the randomization is the correct storage of the EMMs in the databases 3320 and 3322 (which are used for backup purposes) and in the RAM 3324. For a particular cycle rate and operator, the EMMs are stored in a two-dimensional array, by rank 3330 (going say from A to Z) and number in the rank 3332 (going from 0 to N). A third dimension is added by cycle rate 3334, so that there are as many two-dimensional arrays as there are cycle rates. In the preferred embodiment there are 256 ranks and typically 200 or 300 EMMs in each rank; there are 5 cycle rates. A final dimension to the array is added by the presence of different operators; there are as many three-dimensional arrays as there are operators. Storage of the data in this fashion can permit rapid retrieval in the event that the MG wants to delete a particular EMM.

Storage of the EMMs takes place according to the "hash" algorithm (otherwise known as the "one-way hash function". This operates on a modulo approach, so that successive ranks are filled before a higher number in the rank is used, and the number of EMMs in each rank remains roughly constant. The example is considered of there being 256 ranks. When the MG sends the ME an EMM with identifier (ID) 1, the rank "1" is assigned to this EMM, and it takes the first number 3332 in the rank 3330.

The EMM with ID 2 is assigned the rank ("2", and so on, up to the rank 256. The EMM with ID 257 is assigned the rank "1" again (based on the modulo function), and takes the second number in the first rank, and so on.

Retrieval of a specific EMM, for example when deletion of a specific EMM is requested by the MG, is effected by means of the inverse of the above. The hash algorithm is applied to the EMM ID to obtain the rank, after which the number in the rank is found.

The actual randomization occurs when the EMMs are, on a cyclical basis, retrieved from RAM 3324 using the randomization means 3340 which is implemented in the hardware and/or software of the Message Emitter. The retrieval is random, and again based on the hash algorithm. Firstly, a random number (in the above example initially in the range 1 to 256) is chosen, to yield the particular rank of interest. Secondly, a further random number is chosen to yield the particular number in the rank. The further random number is selected according to the total number of EMMs in a given rank. Once a given EMM has been selected and broadcast, it is moved to a second identical storage area in the RAM 3324, again using the hash function. Hence the first area diminishes in size as the EMMs are broadcast, to the extent that, once a complete rank has been used, this is deleted. Once the first storage area is completely empty, it is replaced by the second storage area before a new round of EMM broadcast, and vice versa.

In the above fashion, after two or three cycles of the EMMs, statistically the chances of any two EMMs destined for the same end user being transmitted back to back is negligible.

At regular intervals whilst the EMMs are being stored the computer 3050 computes the number of bytes in storage and from this computes the bitrate of emission given the global bitrate directive from the multiplexer and software multiplexer.

Reference was made above to the backup databases 3320 and 3322. These are in fact in the preferred embodiment sequential file stores, which hold a backup version of what is in the RAM 3324. In the event of failure of the Message Emitter and subsequent restart, or more generally when the ME is being restarted for whatever reason, a link is made between the RAM and the databases, over which the stored EMMs are uploaded to RAM. In this way, the risk of losing EMMs in the event of failure can be removed.

Similar storage of PPV EMMs occurs to that described above in relation to subscription EMMs, with the rank typically corresponding to a given operator and the number in the rank corresponding to the session number.

Smartcard

Figure 18:
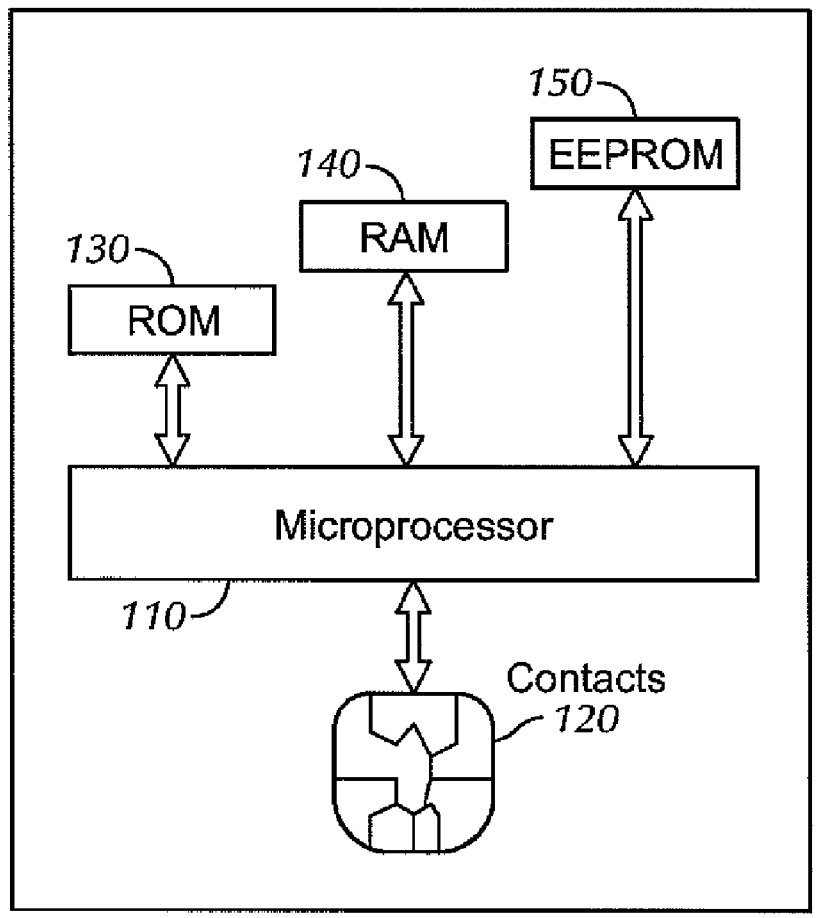
FIG. 18 is a schematic diagram of a smartcard.

A daughter, or "subscriber", smartcard 3020 is schematically shown in FIG. 18 and comprises an 8 bit microprocessor 110, such as a Motorola 6805 microprocessor, having an input/output bus coupled to a standard array of contacts 120 which in use are connected to a corresponding array of contacts in the card reader of the receiver/decoder 2020, the card reader being of conventional design. The microprocessor 110 is also provided with bus connections to preferably masked ROM 130, RAM 140 and EEPROM 150. The smartcard complies with the ISO 7816-1, 7816-2 and 7816-3 standard protocols which determine certain physical parameters of the smartcard, the positions of the contacts on the chip and certain communications between the external system (and particularly the receiver/decoder 2020) and the smartcard respectively and which will therefore not be further described here. One function of the microprocessor 110 is to manage the memory in the smartcard, as now described.

The EEPROM 150 contains certain dynamically-created operator zones 154, 155, 156 and dynamically-created data zones which will now be described with reference to FIG. 19.

Referring to FIG. 19, EEPROM 150 comprises a permanent "card ID" (or manufacturer) zone 151 of 8 bytes which contains a permanent subscriber smartcard identifier set by the manufacturer of the smartcard 3020.

When the smartcard is reset, the microprocessor 110 issues a signal to receiver/decoder 2020, the signal comprising an identifier of the conditional access system used by the smartcard and data generated from data stored in the smartcard, including the card ID. This signal is stored by the receiver/decoder 2020, which subsequently utilises the stored signal to check whether the smartcard is compatible with the conditional access system used by the receiver/decoder 2020.

The EEPROM 150 also contains a permanent "random number generator" zone 152 which contains a program for generating pseudo-random numbers. Such random numbers are used for diversifying transaction output signals generated by the smartcard 3020 and sent back to the broadcaster.

Below the random number generator zone 152 a permanent "management" zone 153 of 144 bytes is provided. The permanent management zone 153 is a specific operator zone utilised by a program in the ROM 130 in the dynamic creation (and removal) of zones 154, 155, 156 . . . as described below.

The permanent management zone 153 contains data relating to the rights of the smartcard to create or remove zones.

The program for dynamically creating and removing zones is responsive to specific zone creation (or removal) EMMs which are transmitted by the SAS 3002 and received by the receiver/decoder 2020 and passed to the subscriber smartcard 3020. In order to create the EMMs the operator requires specific keys dedicated to the management zone. This prevents one operator from deleting zones relating to another operator.

Below the management zone 153 is a series of "operator ID" zones 154, 155, 156 for operators 1, 2 . . . N respectively. Normally at least one operator ID zone will be preloaded into the EEPROM of the subscriber smartcard 3020 so that the end user can decrypt programmes broadcast by that operator. However further operator ID zones can subsequently be dynamically created using the management zone 153 in response to a transaction output signal generated via his smartcard 3020 by the end user (subscriber), as will subsequently be described.

Each operator zone 154, 155, 156 contains the identifier of the group to which the smartcard 3020 belongs, and the position of the smartcard within the group. This data enables the smartcard (along with the other smartcards in its group) to be responsive to a broadcast "group" subscription EMM having that group's address (but not the smartcard's position in the group) as well as to an "individual" (or commercial offers subscription) EMM addressed only to that smartcard within the group. There can be 256 member smartcards of each such group and this feature therefore reduces significantly the bandwidth required for broadcasting EMMs.

In order to reduce further the bandwidth required for broadcasting "group" subscription EMMs, the group data in each operator zone 154, 155, 156 and all similar zones in the EEPROM of smartcard 3020 and the other daughter smartcards is continually updated to enable a particular smartcard to change its position in each group to fill any holes created by e.g. deletion of a member of the group. The holes are filled by the SAS 3002 as in the STM server 3104 there is a list of such holes.

In this manner fragmentation is reduced and each group's membership is maintained at or near the maximum of 256 members.

Each operator zone 154, 155, 156 is associated with one or more "operator data objects" stored in the EEPROM 150. As shown in FIG. 19, a series of dynamically created "operator data" objects 157-165 are located below the operator ID zones. Each of these objects is labelled with:

a) an "identifier" 1, 2, 3 . . . N corresponding to its associated operator 1, 2, 3 . . . N as shown in its left hand section in FIG. 19;
b) an "ID" indicating the type of object; and
c) a "data" zone reserved for data, as shown in the right hand section of each relevant operator object in FIG. 19. It should be understood that each operator is associated with a similar set of data objects so that the following description of the types of data in the data objects of operator 1 is also applicable to the data objects of all the other operators. Also it will be noted that the data objects are located in contiguous physical regions of the EEPROM and that their order is immaterial.

Deletion of a data object creates a "hole" 166 in the smartcard, that is, the number of bytes that the deleted objects had previously occupied are not immediately occupied. The thus "freed" number of bytes, or "hole" are labelled with:

a) an "identifier" 0; and
b) an "ID" indicating that the bytes are free to receive an object.

The next data object created fills the hole, as identified by the identifier 0. In this manner the limited memory capacity (4 kilobytes) of the EEPROM 150 is efficiently utilised.

Turning now to the set of data objects associated with each operator, examples of the data objects are now described.

Data object 157 contains an EMM key used for decrypting encrypted EMM's received by the receiver/decoder 2020. This EMM key is permanently stored in the data object 157. This data object 157 may be created prior to distribution of the smartcard 3020, and/or may be created dynamically when creating a new operator zone (as described above).

Data object 159 contains ECM keys which are sent by the associated operator (in this case operator 1) to enable the end user to decrypt the particular "bouquet" of programs to which he has subscribed. New ECM keys are sent typically every month, along with a group subscription (renewal) EMM which renews the end user's overall right to view the broadcast from (in this case) operator 1. The use of separate EMM and ECM keys enables viewing rights to be purchased in different ways (in this embodiment by subscription and individually (Pay Per View)) and also increases security. The Pay Per View (PPV) mode will be described subsequently.

Since new ECM keys are sent periodically, it is essential to prevent a user from using old ECM keys, for example by switching off the receiver/decoder or re-setting a clock to prevent expiry of an old ECM key so that a timer in the receiver/decoder 2020 could be overridden. Accordingly operator zone 154 comprises an area (typically having a size of 2 bytes) containing an obsolescence date of the ECM keys. The smartcard 3020 is arranged to compare this date with the current date which is contained in received ECMs and to prevent decryption if the current date is later than the obsolescence date. The obsolescence date is transmitted via EMMs, as described above.

Data object 161 contains a 64 bit subscription bitmap which is an exact representation of the broadcast operator's programs to which the subscriber has subscribed. Every bit represents a program and is set to "1" if it is subscribed to and "0" if it is not.

Data object 163 contains a quantity of tokens which can be used by the consumer in PPV mode to buy viewing rights to an imminent broadcast e.g. in response to a free preview or other advertisement. Data object 163 also contains a limit value, which may be set to e.g. a negative value to allow credit to the consumer. Tokens can be purchased e.g. by credit and via the modemmed back channel 4002, or by using a voice server in combination with a credit card, for example. A particular event can be charged as one token or a number of tokens.

Figure 20:
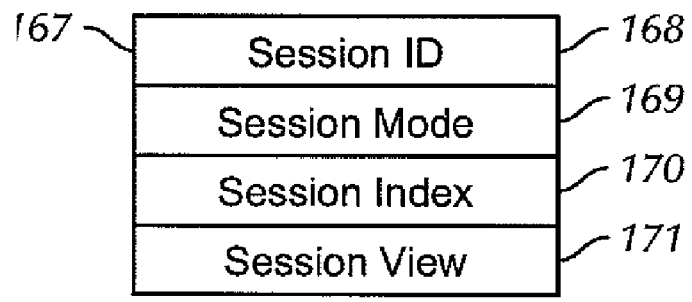
FIG. 20 is a schematic diagram of a PPV event description.

Data object 165 contains a description of a PPV event, as shown with reference to table 167 of FIG. 20.

The PPV event description 167 contains a "session ID" 168 identifying the viewing session (corresponding to the program and the time and date of broadcasting) a "session mode" 169 indicating how the viewing right is being purchased (e.g. in pre-book mode), a "session index" 170 and a "session view" 171.

In respect of receiving a programme in PPV mode, the receiver decoder 2020 determines whether the programme is one sold in PPV mode. If so, the decoder 2020 checks, using the items stored in the PPV event description 167 whether the session ID for the programme is stored therein. If the session ID is stored therein, the control word is extracted from the ECM.

If the session ID is not stored therein, by means of a specific application the receiver/decoder 2020 displays a message to the end user indicating that he has the right to view the session at a cost of, say, 25 tokens, as read from the ECM or to connect to the communications servers 3022 to purchase the event. Using the tokens, if the end user answers "yes" (by means of remote controller 2026 (see FIG. 2)) the decoder 2020 sends the ECM to the smartcard, the smartcard decreases the wallet of the smartcard 3020 by 25 tokens, writes the session ID 168, the session mode 169, the session index 170 and the session view 171 in the PPV event description 167 and extracts and deciphers the control word from the ECM.

In the "pre-book" mode, an EMM will be passed to the smartcard 3020 so that the smartcard will write the session ID 168, the session mode 169, the session index 170 and the session view 171 in the PPV event description 167 using the EMM.

The session index 170 can be set to differentiate one broadcast from the other. This feature permits authorization to be given for a subset of broadcasts, for example, 3 times out of 5 broadcasts. As soon as an ECM with a session index different from the current session index 170 stored in the PPV event description 167 is passed to the smartcard, the number of the session view 171 is decreased by one. When the session view reaches zero, the smartcard will refuse to decipher an ECM with a different session index to the current session index.

The initial value of the session view depends only on the way in which the broadcast supplier wishes to define the event to which it relates; the session view for a respective event may take any value.

The microprocessor 110 in the smartcard implements a counting and a comparison program to detect when the limit to the number of viewings of a particular program has been reached.

All of the session ID 168, the session mode 169, the session index 170 and the session view 171 in the PPV event description 167 may be extracted from the smartcard using the "callback" procedure as described previously.

Each receiver/decoder 2020 contains an identifier which may either identify uniquely that receiver/decoder or identify its manufacturer or may classify it in some other way in order to enable it to work only with a particular individual smartcard, a particular class of smartcards made by the same or a corresponding manufacturer or any other class of smartcards which are intended for use with that class of receiver/decoders exclusively.

In this manner the receiver/decoders 2020 which have been supplied by one broadcast supplier to the consumer are protected against the use of non-authorised daughter smartcards 3020.

Additionally or alternatively to this first "handshake" between the smartcard and the receiver, the EEPROM of the smartcard 3020 could contain a field or bitmap describing the categories of receiver/decoders 2020 with which it can function. These could be specified either during the manufacture of the smartcard 3020 or by a specific EMM.

The bitmap stored in the smartcard 3020 typically comprises a list of up to 80 receiver/decoders, each identified with a corresponding receiver/decoder ID with which the smartcard may be used. Associated with each receiver/decoder is a level "1" or "0" indicating whether the smartcard may be used with the receiver/decoder or not, respectively. A program in the memory 2024 of the receiver/decoder searches for the identifier of the receiver/decoder in the bitmap stored in the smartcard. If the identifier is found, and the value associated with the identifier is "1", then the smartcard is "enabled"; if not, then the smartcard will not function with that receiver/decoder.

In addition, if, typically because of an agreement between operators, it is desired to authorize the use of other smartcards in a particular receiver/decoder, specific EMMs will be sent to those smartcards to change their bitmap via the transponder 2014.

Each broadcast supplier may differentiate his subscribers according to certain predetermined criteria. For example, a number of subscribers may be classed as "VIPs". Accordingly, each broadcast supplier may divide his subscribers into a plurality of subsets, each subset comprising any number of subscribers, The subset to which a particular subscriber belongs is set in the SMS 3004. In turn, the SAS 3002 transmits an EMM to the subscriber which writes information (typically of length 1 byte) concerning the subset to which the subscriber belongs into the relevant operator data zone, say 154, of the EEPROM of the smartcard. In turn, as events are broadcast by the broadcast supplier, an ECM, typically of 256 bits, is transmitted with the event and indicating which of the subsets of subscribers may view the event. If, according to the information stored in the operator zone, the subscriber does not have the right to view the event, as determined by the ECM, programme viewing is denied.

This facility may be used, for example, to switch off all of a given operator's smartcards in a particular geographical region during the transmission of a particular program, in particular a program relating to a sports fixture taking place in that geographical region. In this manner football clubs and other sport bodies can sell broadcasting rights outside their locality whilst preventing local supporters from viewing the fixture on television. In this manner the local supporters are encouraged to buy tickets and attend the fixture.

Each of the features associated with zones 151 to 172 is considered to be a separate invention independent of the dynamic creation of zones.

It will be understood that the present invention has been described above purely by way of example, and modifications of detail can be made within the scope of the invention.

Each feature disclosed in the description, and (where appropriate) the claims and drawings may be provided independently of in any appropriate combination.

In the aforementioned preferred embodiments, certain features of the present invention have been implemented using computer software. However, it will of course be clear to the skilled man that any of these features may be implemented using hardware. Furthermore, it will be readily understood that the functions performed by the hardware, the computer software, and such like are performed on or using electrical and like signals.

Cross reference is made to our co-pending applications, all bearing the same filing date, and entitled Signal Generation and Broadcasting, Smartcard for use with a Receiver of Encrypted Broadcast Signals, and Receiver, Broadcast and Reception System and Conditional Access System therefor, Downloading a Computer File from a Transmitter via a Receiver/Decoder to a Computer, Transmission and Reception of Television Programmes and Other Data, Downloading Data, Computer Memory Organisation, Television or Radio Control System Development, Extracting Data Sections from a Transmitted Data Stream, Access Control System, Data Processing System, and Broadcast and Reception System, and Receiver/Decoder and Remote Controller therefor. The disclosures of these documents are incorporated herein by reference. The list of applications includes the present application.

The invention claimed is:

1. A conditional access system for affording conditional access to subscribers, comprising:
   a receiver for a subscriber;
   a subscriber management system for at least storing subscription information of said subscriber;
   a subscriber authorization system coupled to the subscriber management system;
   a communications server, wherein said communications server is connected directly to the subscriber authorization system without passing through the subscriber management system; and
   a direct link for connecting the receiver with the communications server, wherein the subscriber management system sends a subset of the subscriber information to said subscriber authorization system, wherein the subset of the subscriber information comprises subscriber access rights,
   wherein said subscriber authorization system is adapted to:
      generate entitlement management messages using the subset of the subscriber information, in response to a command received from said receiver via said communications server, and wherein said entitlement management messages are sent back to said receiver via the direct link; and
      renew the subscriber's access rights automatically, wherein the subscriber authorization system stores the subset of subscriber information received from the subscriber management system for generating renewal messages.

2. A conditional access system according to claim 1, further comprising a receiver/decoder for the subscriber, the receiver/decoder being connectable to said communications server, and hence to said subscriber authorization system, via a modem and a telephone link.

3. A conditional access system according to claim 2, further comprising a satellite transponder, said subscriber authorization system being arranged to transmit a message as a packet of digital data to said receiver/decoder either via said communications server or via said satellite transponder.

4. The conditional access system according to claim 1, further comprising:
   a subscriber receiver/decoder operatively connected to the communications server; and
   the subscriber authorization system, comprising:
      an order centralized server connected to the communications server for receiving commands from the receiver/decoder and subscriber information from the subscriber management system;
      an authorization server connected to the order centralized server for identifying and validating a subscriber in response to an authorization request from the order centralized server; and
      a message generator connected to the order centralized server for generating entitlement management messages in response to a command received from the order centralized server, wherein the message generator is part of a subscription chain located in the SAS;
      said order centralized server being adapted to issue said command to the message generator in response to data received from at least one of said authorization server and said subscription management system, and to transmit said entitlement management messages to the receiver/decoder via the communications server.

5. The conditional access system of claim 1, wherein the subscriber management system sends subscriber information to the subscriber authorization system when changes occur in the subscriber's data.

6. The conditional access system of claim 1, wherein the command is at least one command selected from a group consisting of a product order command, a subscription modification request command, and a parental code reset command.

* * * * *

UNITED STATES PATENT AND TRADEMARK OFFICE
CERTIFICATE OF CORRECTION

PATENT NO. : 7,644,429 B2
APPLICATION NO. : 10/201641
DATED : January 5, 2010
INVENTOR(S) : Bayassi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1542 days.

Signed and Sealed this

Sixteenth Day of November, 2010

David J. Kappos
*Director of the United States Patent and Trademark Office*